United States Patent
Yamamoto

(10) Patent No.: US 7,286,268 B2
(45) Date of Patent: Oct. 23, 2007

(54) IMAGE PROCESSING APPARATUS CAPABLE OF PREVENTING PSEUDO CONTOUR

(75) Inventor: Toshitsugu Yamamoto, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 30 days.

(21) Appl. No.: 11/081,620

(22) Filed: Mar. 17, 2005

(65) Prior Publication Data

US 2005/0219621 A1    Oct. 6, 2005

Related U.S. Application Data

(62) Division of application No. 09/713,320, filed on Nov. 16, 2000, now Pat. No. 7,009,731.

(30) Foreign Application Priority Data

Nov. 18, 1999 (JP) ............................. 11-327923
Dec. 2, 1999 (JP) ............................. 11-343266

(51) Int. Cl.
*H04N 1/405* (2006.01)
(52) U.S. Cl. .................. 358/3.22; 358/3.06; 358/3.14
(58) Field of Classification Search ............. 358/1.9, 358/2.1, 3.09–3.15, 3.06, 3.21–3.22
See application file for complete search history.

(56) References Cited

U.S. PATENT DOCUMENTS

| 5,073,966 | A | * | 12/1991 | Sato | 382/237 |
| 5,140,432 | A | | 8/1992 | Chan | 358/3.03 |
| 5,737,453 | A | | 4/1998 | Ostromoukhov | 382/275 |
| 5,757,976 | A | | 5/1998 | Shu | 382/252 |
| 5,815,280 | A | | 9/1998 | Ohmura et al. | 358/296 |
| 6,014,226 | A | * | 1/2000 | Harrington et al. | 358/1.9 |
| 6,068,361 | A | | 5/2000 | Mantell | 347/15 |
| 6,233,360 | B1 | | 5/2001 | Metcalfe et al. | 382/252 |
| 6,342,950 | B1 | | 1/2002 | Tabata et al. | 358/1.6 |
| 6,445,464 | B1 | | 9/2002 | Kishimoto | |
| 6,556,214 | B1 | | 4/2003 | Yamada et al. | 345/616 |

FOREIGN PATENT DOCUMENTS

| JP | 11-215377 | 8/1999 |
| JP | 11-261819 | 9/1999 |
| JP | 2000-6444 | 1/2000 |

OTHER PUBLICATIONS

Japanese Office Action, with English Translation, issued in corresponding Japanese Patent Application No. 11-327923, dated Jul. 27, 2007.

* cited by examiner

*Primary Examiner*—Thomas D. Lee
*Assistant Examiner*—Stephen Brinich
(74) *Attorney, Agent, or Firm*—McDermott Will & Emery LLP

(57) ABSTRACT

There is provided an image processing apparatus employing an error diffusion method capable of preventing a pseudo contour attributable to a delayed dot. The image processing apparatus receives an error diffused from a neighboring pixel and corrects a value (an input value of 0 to 1) of a pixel to be processed before it reduces a tone. Then a subtracter calculates an error associated with the tone reduction, which is diffused to a neighboring pixel. Herein, only for an input value of no less than 0.5 an inversion portion multiplies by −1 an error from a neighboring pixel and an error to a neighboring pixel. Thus a dot can be free of delay to prevent a pseudo contour.

18 Claims, 27 Drawing Sheets

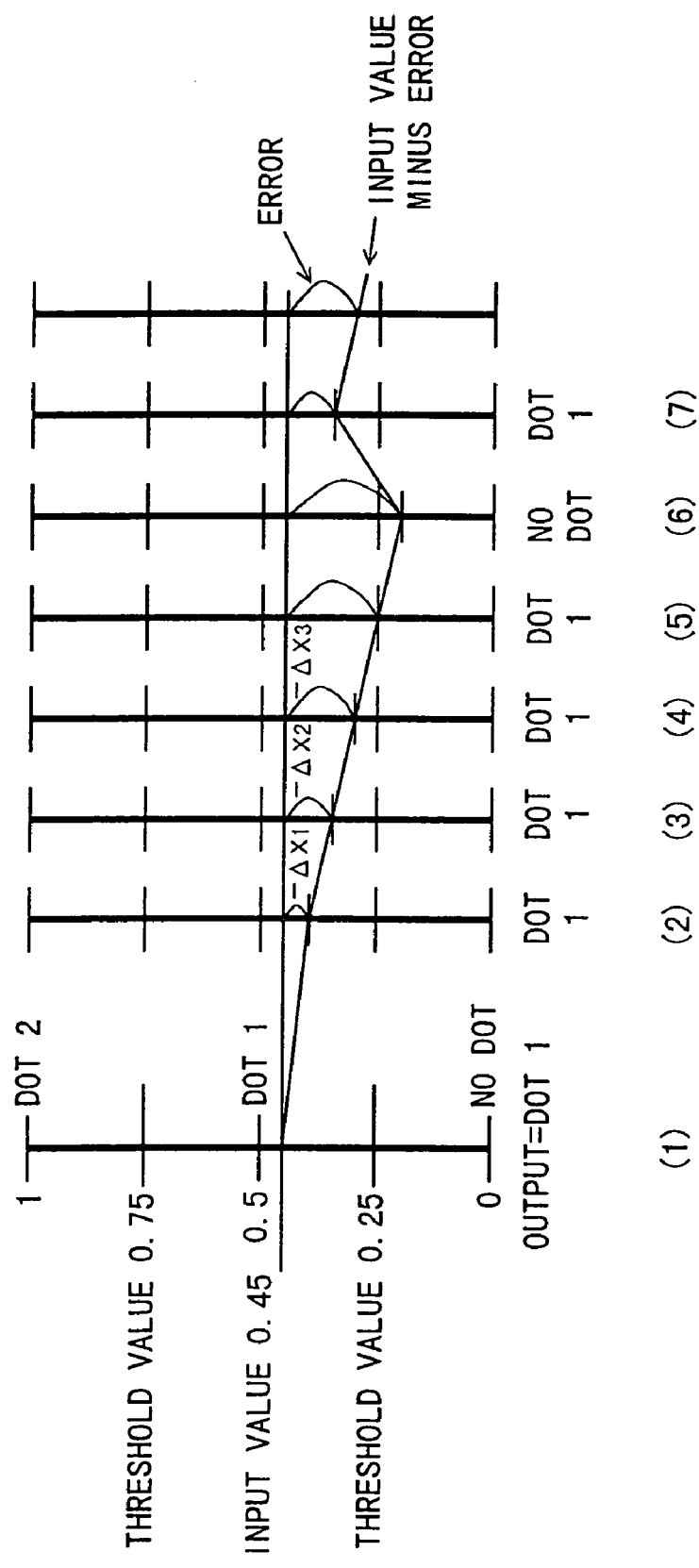

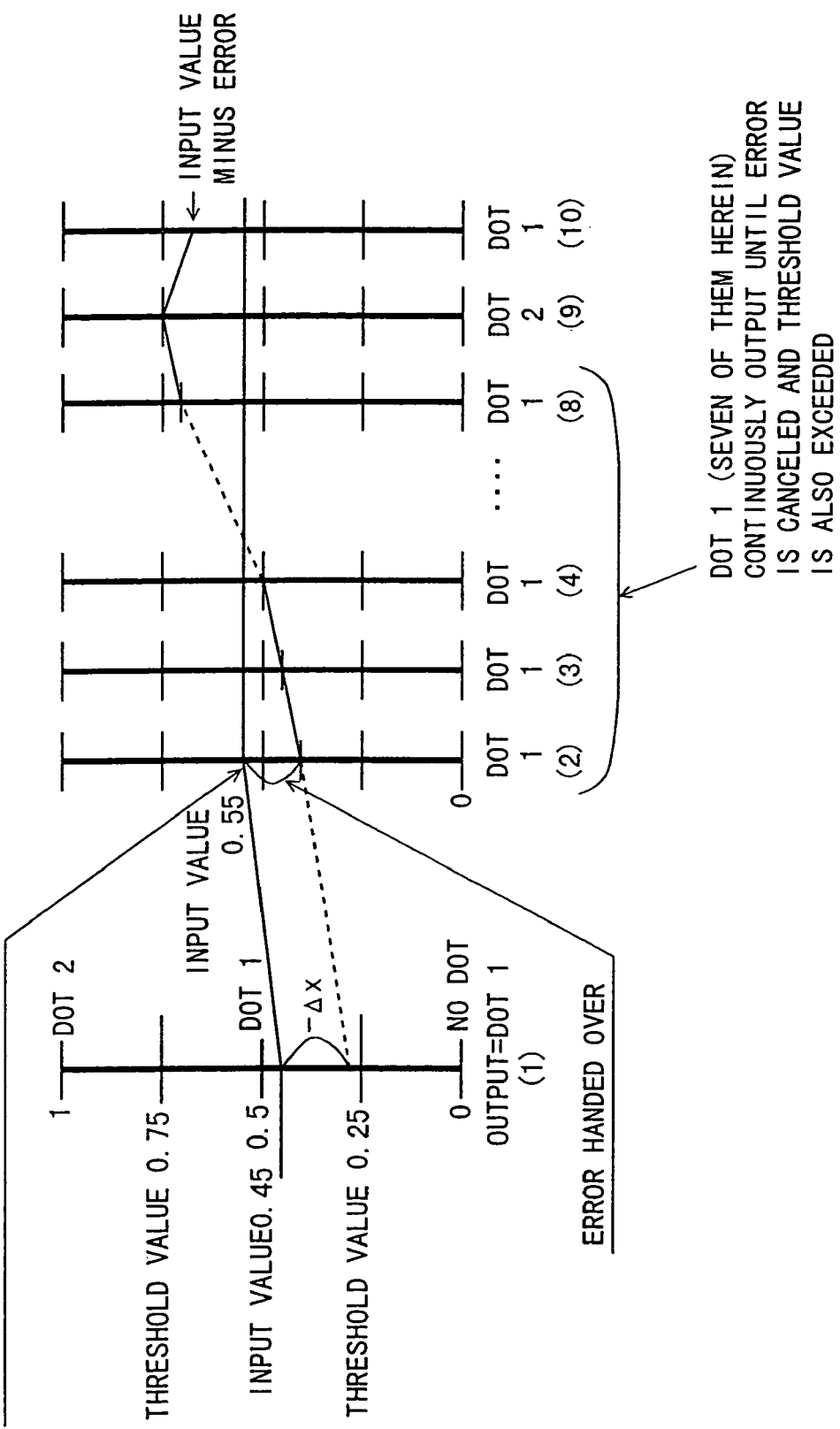

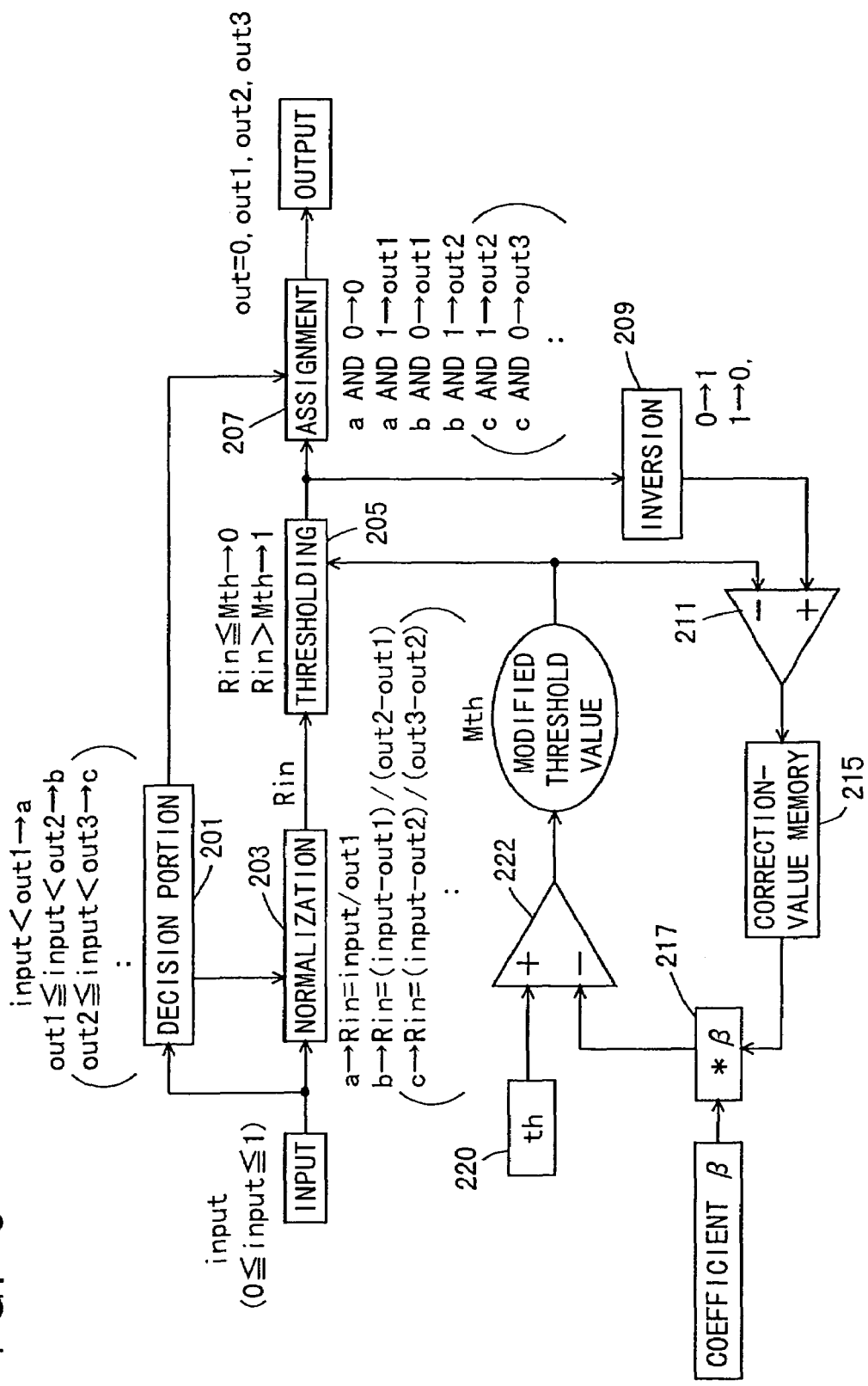
F I G. 5

F I G. 6
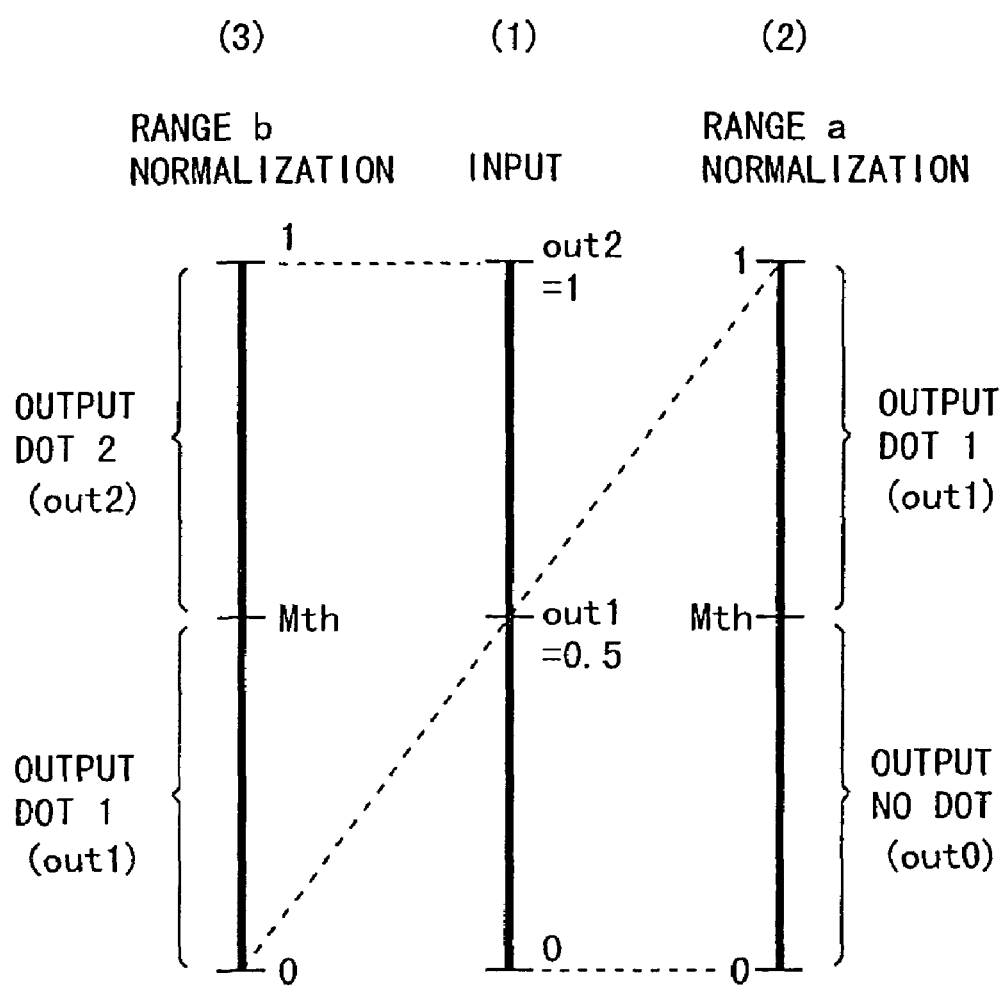

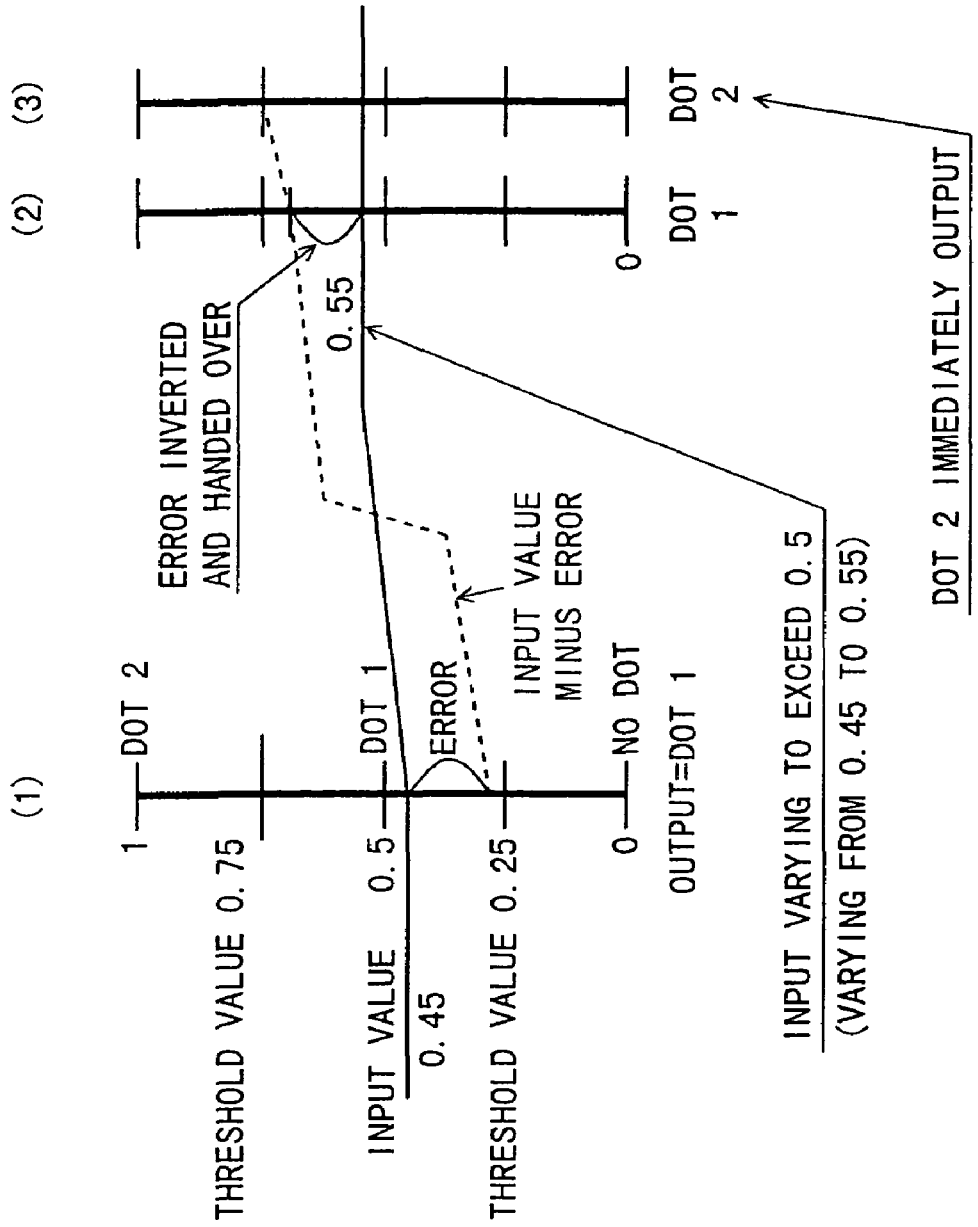

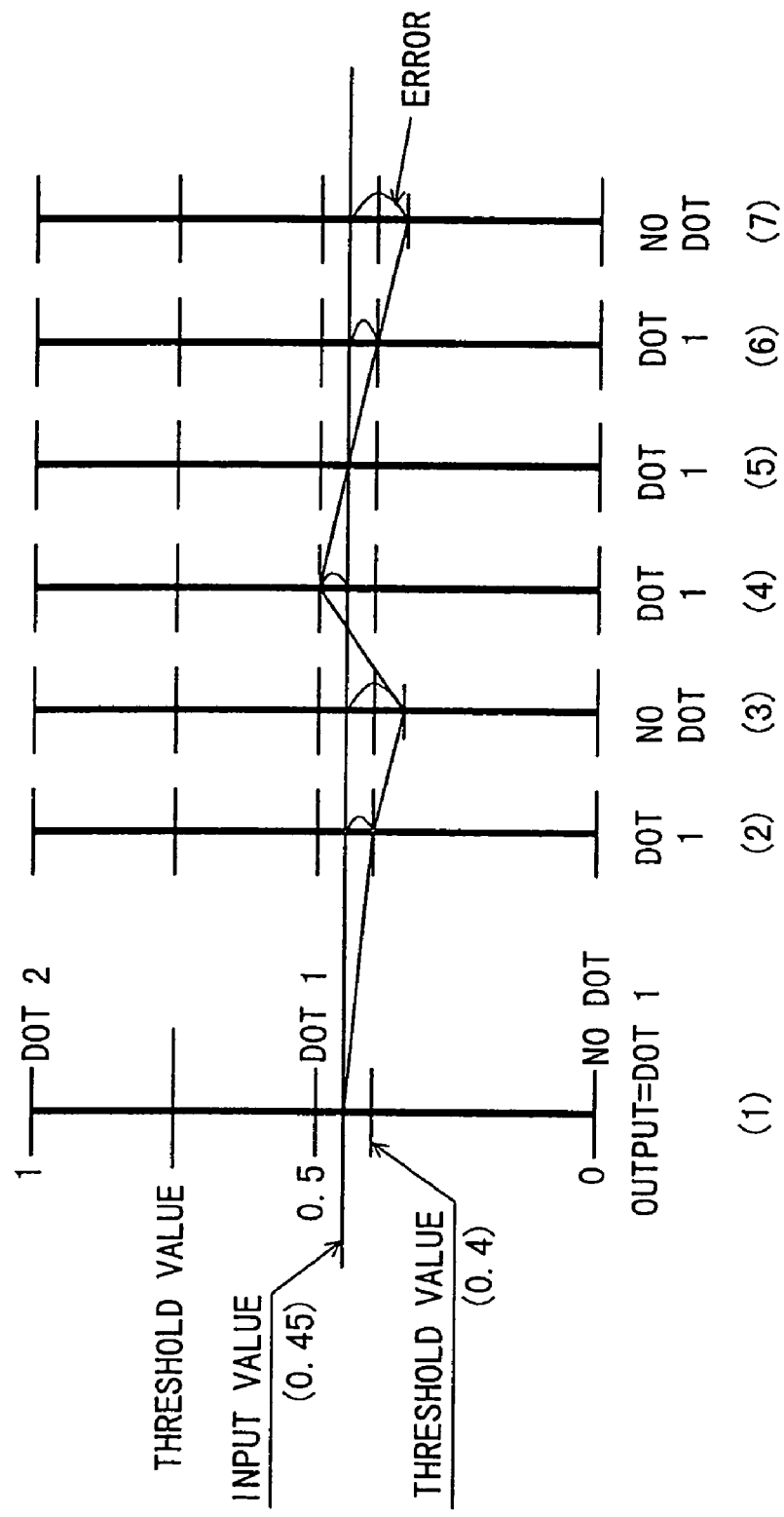

F I G. 1 8
RELATIONSHIP BETWEEN INPUT AND THRESHOLD
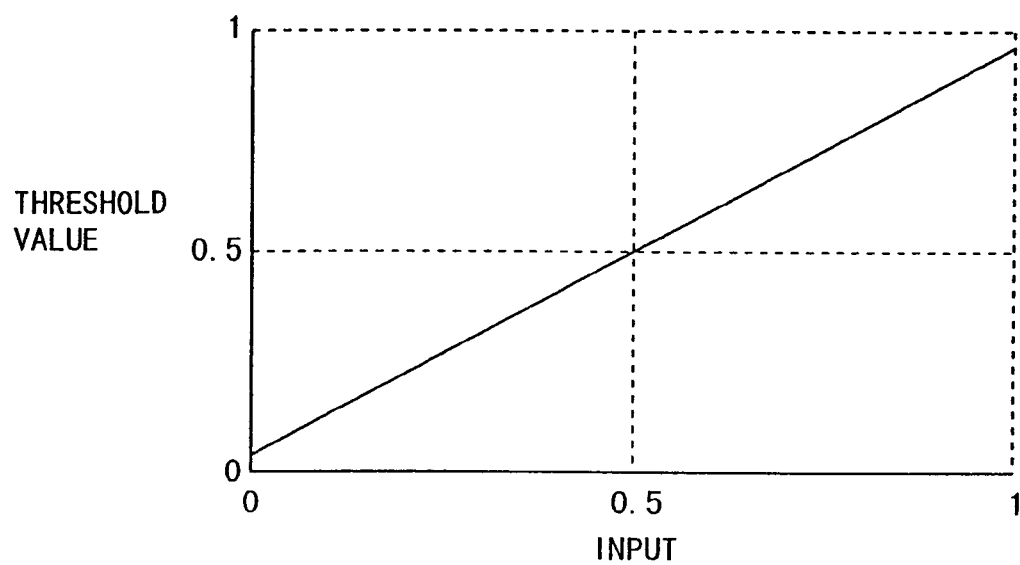
F I G. 1 9
RELATIONSHIP BETWEEN INPUT AND THRESHOLD
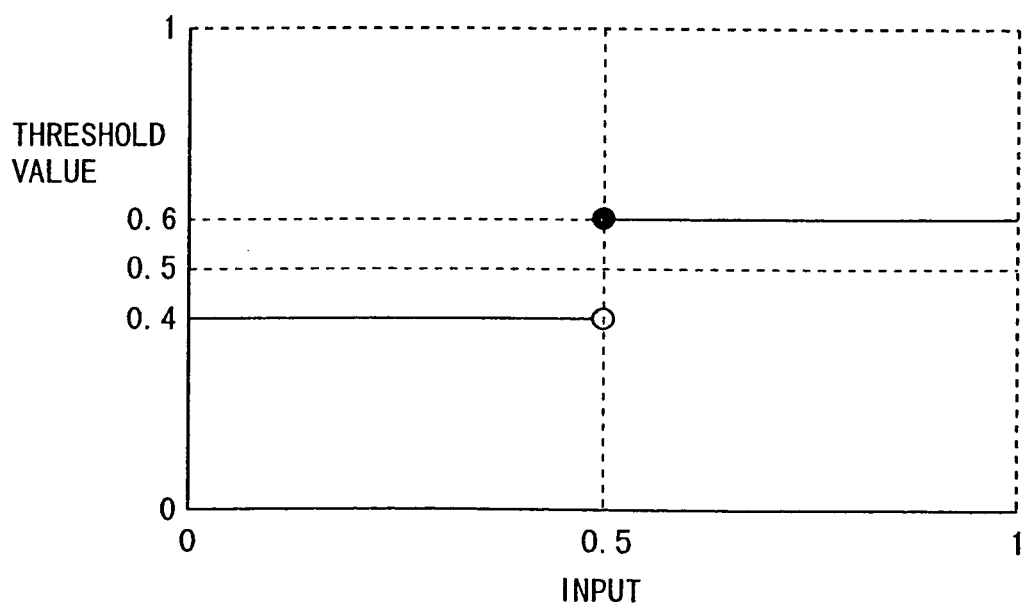

ALGORITHM OF ERROR DIFFUSION METHOD

F I G. 3 0
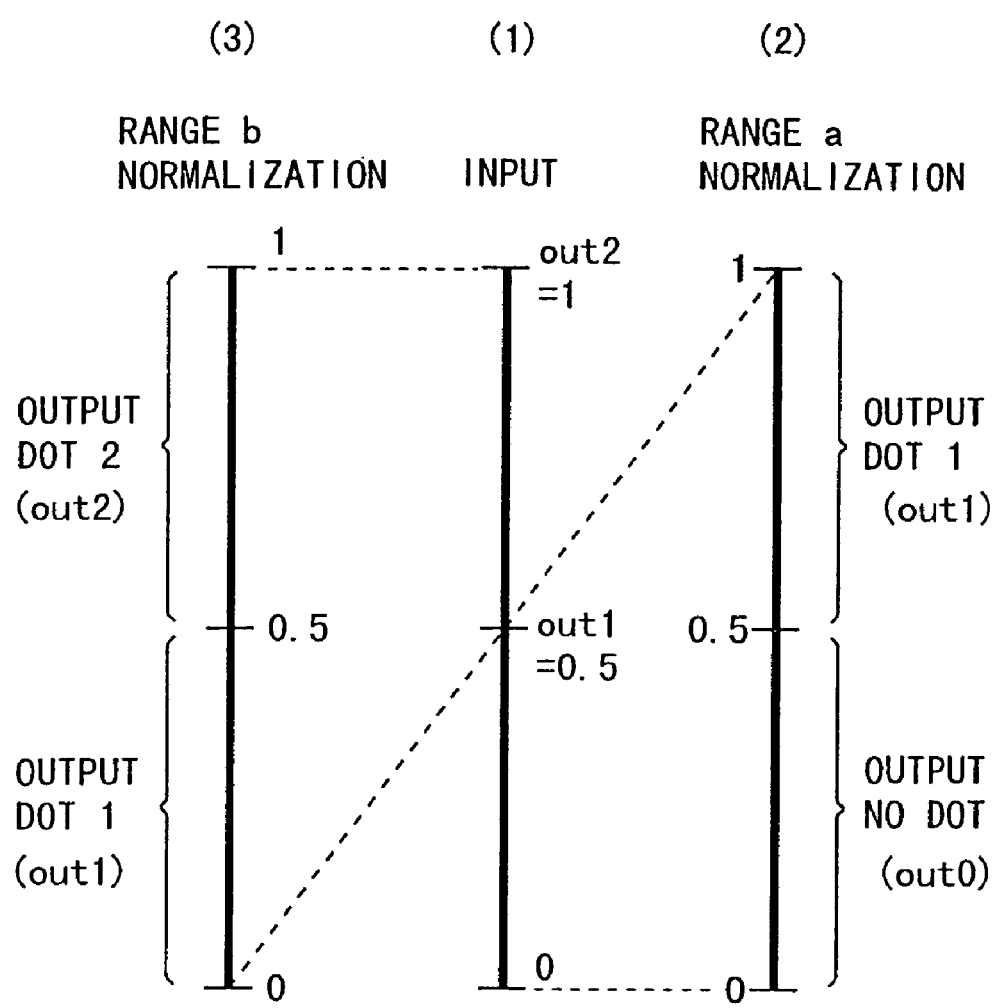

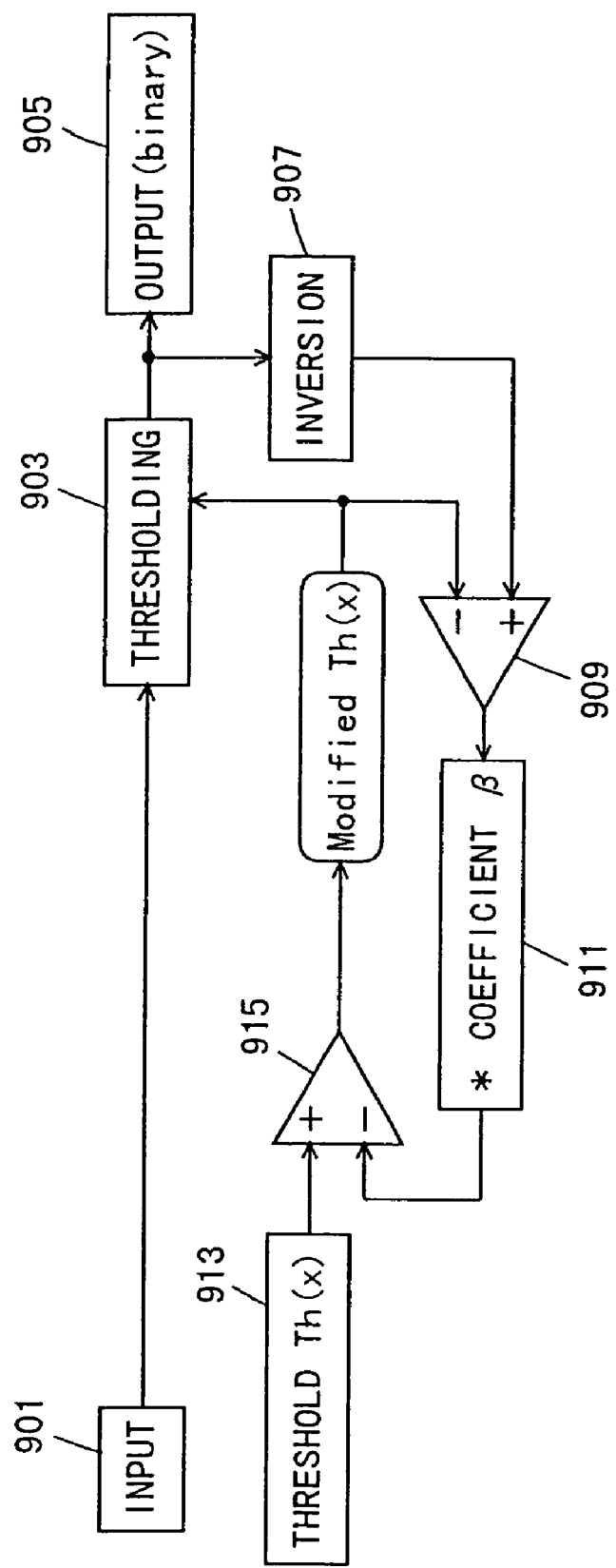
F I G. 3 1

OCCURRENCE OF PSEUDO CONTOUR ASSOCIATED WITH MULTI-VALUED PROCESS

IMAGE PROCESSING APPARATUS CAPABLE OF PREVENTING PSEUDO CONTOUR

RELATED APPLICATIONS

This application is a divisional application of U.S. patent application Ser. No. 09/713,320, filed Nov. 16, 2000, now U.S. Pat. No. 7,009,731, and which is based on Application Nos. 11-327923 and 11-343266 filed in Japan on Nov. 18 and Dec. 2, 1999, respectively, the contents of which are hereby incorporated by reference.

BACKGROUND OF THE INVENTION

1. Field of the Invention

The present invention relates generally to image processing apparatus and in particular to image processing apparatus capable of preventing pseudo contour.

2. Description of the Related Art

A conventionally known image processing apparatus converts an input signal representing the density level of each pixel with a predetermined number of tones, into a signal with a number of tones smaller than the predetermined number of tones. Furthermore, an error diffusion method is also known as a technique used to generally reproduce the density level of an input signal if a tone is reduced.

FIG. 27 is a block diagram showing a configuration of an image processing apparatus employing an error diffusion method, reducing the tone of an input value for output. Herein there will be described an example with two types of dots employed to ternarize an input image. More specifically, a dot 2 corresponding to a dark dot, a dot 1 corresponding to a light dot and no dot (a dot 0) for a total of three states are used to reproduce an image.

With reference to the figure, this apparatus receives as an input value a density level of a single pixel represented by a numerical value ranging from 0 to 1 (in a multi-value), and outputs dot 0, 1 or 2.

Herein, control determines in which range the input value falls and in each range it is binarized. Herein, there are provided a range of 0 to 0.5 and a range of 0.5 to 1 for a total of two ranges. More specifically, if an input value falls within the range of 0 to 0.5 then one of dots 0 and 1 is output and if an input value falls within the range of 0.5 to 1 then one of dots 1 and 2 is output. Thus an image is reproduced.

More specifically, with reference to FIG. 27, the image processing apparatus is configured of subtracters 103 and 107 and a thresholding portion 105. Subtracter 103 receives a density level (an input value) and subtracts therefrom an error of a neighboring pixel (a correction value).

Thresholding portion 105 compares an output x of subtracter 103 with a predetermined threshold value (for example of 0.25 and 0.75 herein). If x<0.25 then 0 is output. If 0.25≦x<0.75 then 0.5 is output. If x≧0.75 then 1 is output. If thresholding portion 105 outputs 0 then dot 0 is output. If thresholding portion 105 outputs 0.5 then dot 1 is output. If thresholding portion 105 outputs 1 then dot 2 is output.

According to the output from thresholding portion 105, output x of subtracter 103 is subtracted by subtracter 107 to provide an error (a correction value) of the pixel of interest. The error is diffused to a neighboring pixel.

FIG. 28 represents a relationship between density of image data input and density of dot. For an input in a range of 0 to 0.5, dot 1 has a density increasing from 0 to 1. For an input in a range from 0.5 to 1, dot 1 has a density decreasing from 1 to 0 and dot 2 instead has a density increasing from 0 to 1. As such, for the entirety of the image, a proportional relationship is established between an input and an output, as indicated by ③.

Furthermore, the image processing apparatus may alternatively be configured as shown in FIG. 29.

With reference to FIG. 29, the image processing apparatus includes a decision portion 201 determining in which range an input value falls, a normalization portion 203 normalizing an input value to allow the input value to fall within a predetermined range, a subtracter 205 providing an error substraction process, a thresholding portion 207 referring to a predetermined threshold value (of 0.5 herein) to provide a thresholding process, an assignment portion 209 referring to a result obtained from decision portion 201 and a result of the thresholding process to output one of dots 0, 1 and 2, and a subtracter 211 calculating an error. Note that herein to simplify the description an input value is 0 to 1 and it is ternarized, as shown in FIGS. 27 and 28, although in decision portion 201 the number of ranges to be determined may further be increased to provide more than three values to be used for processing an image.

Reference will now be made to FIG. 30 to describe an operation of the FIG. 29 apparatus. As shown in FIG. 30 (1), an input value falls within a range of 0 to 1. Herein, if an input value is no less than 0 and less than 0.5 then decision portion 201 determines that the input value falls within a range a. If an input is no less than 0.5 and no more than 1 then decision portion 201 determines that it falls within a range b. If an input value falls within range a then the input value is normalized to fall within a range of 0 to 1, as shown in FIG. 30 (2). In contrast, if an input value falls within range b then the input value is normalized to fall within a range of 0 to 1, as shown in FIG. 30 (3). For either one of ranges a and b, thresholding portion 207 provides a thresholding process with a threshold value of 0.5. Then, if the input value in range a that is normalized is no more than 0.5 then no dot (dot 0) is output and if it exceeds 0.5 then dot 1 is output.

In contrast, if the input value in range b that is normalized is no more than 0.5 then dot 1 is output and if it exceeds 0.5 then dot 2 is output. Thus, in FIG. 29 there can be provided a process similar to that as shown in FIGS. 27 and 28.

Furthermore, the Applicant of the present application also suggests in Japanese Patent Application No. 11-237492 a threshold diffusion method diffusing a difference between a threshold value and an output value to a threshold value used to process a neighboring pixel.

FIG. 31 is a block diagram showing a configuration of an image processing apparatus employing the threshold diffusion method.

With reference to the figure, the image processing apparatus includes an input portion 901 inputting a pixel value of image data to be processed, a thresholding portion 903 thresholding a pixel value, an output portion 905 outputting a result of the thresholding process, an initial threshold generation portion 913 outputting an initial threshold value Th (x), a subtracter 915 subtracting a correction value for a threshold value from a value received from initial threshold generation portion 913, an inversion portion 907 inverting a result of the thresholding process, a subtracter 909 subtracting an output of subtracter 915 from an output of inversion portion 907 to output a correction value for a threshold value, and a β multiplication portion 911 multiplying an output of subtracter 909 by a coefficient β.

If the threshold diffusion method is applied to an image processing apparatus a correction value for a threshold value is diffused to a threshold value used to process a neighboring pixel.

Such an image processing apparatus as described above reducing a tone for output can binarize a tone of a multi-tone image (or represent an image with two states i.e., by outputting a dot and not outputting a dot) and can also apply multiple threshold values to provide a tone in more than two values (or represent an image with more than two states, such as dots of different sizes).

A digital half toning technique of a feedback system employing the above mentioned error diffusion method, threshold diffusion method and the like, has a disadvantage that a pseudo contour is created at a portion at which a dot switches, as shown in FIG. 32. A pseudo contour means a phenomenon that only a specific dot (a gray dot 1 in FIG. 32) is continuously produced more than required, as shown in FIG. 32 at the right-hand, enlarged view.

Conventionally, there has not been found a cause of such a pseudo contour and to accommodate it disturbance is exclusively applied to render the pseudo contour less noticeable.

SUMMARY OF THE INVENTION

The present invention contemplates an image processing apparatus capable of essentially preventing a pseudo contour.

The present Inventor has studied why such a pseudo contour as above occurs and invented an image processing apparatus capable of preventing the pseudo contour. Initially, a description will now be provided of a cause of the pseudo contour.

FIG. 1 illustrates an error diffusion method diffusing an error. With reference to the figure at (1), an input value can have a range from 0 to 1 for the sake of convenience. If the input value falls within a range of 0 to 0.5 (a range a), a threshold value of 0.25 is applied to determine whether dot 0 (or no dot) or dot 1 is output. In contrast, for the input value falling within a range of 0.5 to 1 (a range b), a threshold value of 0.75 is applied to determine whether dot 1 or dot 2 is output.

If a constant input value of 0.45 is provided for any pixels, then in an initial pixel processing (1) an input value, in range a, is compared with the threshold value of 0.25. Since the input value is larger than the threshold value, dot 1 is output and a value of 0.05 obtained by subtracting 0.45 from 0.5 is diffused as an error to a neighboring pixel.

Then, in a subsequent pixel processing (2) a value obtained by subtracting error $\Delta x$ from an input value is compared with the threshold value of 0.25. In the FIG. 1 process, from processings (1) through (6) errors are accumulated and in processing (6) an input value minus the cumulative error is less than the threshold value of 0.25. As such, from processings (1) through (5) dot 1 is output and in processing (6) dot 0 (no dot) is output.

Since a reduced error is provided in processing (6), in processing (7) an input value minus an error again exceeds the threshold value of 0.25 and dot 1 is output. Then, processing (2) and those subsequent thereto are similarly provided. As such, an input value minus an error wavers around the threshold value of 0.25.

Reference will now be made to FIG. 2 to consider a case when an input value varies from 0.45 (corresponding to "no dot" of 10% and dot 1 of 90%) to 0.55 (corresponding to dot 1 of 90% and dot 2 of 10%).

As shown in FIG. 2 at (1), for the input value of 0.45 there has already been provided an cumulative error of $\Delta x$ for the sake of convenience. Herein, as shown in FIG. 2 at (2), if an input value has changed to 0.55 then error $\Delta x$ is handed over.

Then, in processing (2) and those subsequent thereto, dot 1 is continuously output until error $\Delta x$ already accumulated in processing (1) is canceled and an input value minus an error also exceeds a threshold value of 0.75, i.e., until processing (9).

Thus, only dot 1 is output for a relatively long period of time (a dot is delayed), which causes a pseudo contour. For an input of 0.55, the ratio of dot 1 to dot 2 is typically 90% to 10%. As such, essentially, for the first or second pixel dot 2 needs to be output.

Thus the present invention provides an image processing apparatus capable of preventing a pseudo contour with such a technique as described hereinafter.

The present invention in one aspect provides an image processing apparatus converting a first image signal representing a level in density of each pixel with a predetermined number of tones, successively into a second image signal with a number of tones smaller than the predetermined number of tones, including: a determiner successively receiving the first image signal for each pixel and determining a range for a level in density of each pixel; an outputter comparing the level in density of each pixel with a threshold value corresponding to the range determined, for conversion into the second image signal for output; and a corrector referring to a level in magnitude of the second image signal output from the outputter and the level in density of the first image signal to calculate a correction value correcting a level in density of a subsequent pixel for correction, the corrector changing a method of calculating the correction value when a range determined for the first image signal for a successively input pixel differs from a range determined for the first image signal for an immediately previously input pixel The present invention in another aspect provides an image processing apparatus converting a first image signal representing a level in density of each pixel with a predetermined number of tones, successively into a second image signal with a number of tones smaller than the predetermined number of tones, including: a determiner successively receiving the first image signal for each pixel and determining a range for a level in density of each pixel; an inverter inverting a level in density of an input signal when the input signal has the level in density falling within a particular range; a normalizer normalizing the level in density of the input signal to allow the level in density of the input signal to fall within a predetermined range; a comparator comparing the level in density normalized with a predetermined threshold value to output a result by comparison; an outputter referring to a result obtained from the determiner and a result obtained from the comparator to output the second image signal with the number of tones smaller than the predetermined number of tones; and a corrector referring to the result obtained from the comparator and the level in density normalized, to correct a level in density normalized of a subsequent pixel.

The present invention in still another aspect provides an image processing apparatus converting an input signal representing a level in density of each pixel with a predetermined number of tones, into a signal with a number of tones smaller than the predetermined number of tones, including: a first outputter comparing the input signal having a level in density falling within a first range with a first threshold value to output a signal of a first tone or a second tone; a second outputter comparing the input signal having a level in density falling within a second range subsequent to the first range with a second threshold value to output a signal of the second tone or a third tone; and a controller controlling the first and second threshold values to be provided substantially in succession on a boundary of the first and second ranges.

Furthermore the present Inventor has studied why a pseudo contour occurs in a threshold diffusion method and invented an image processing apparatus capable of preventing the pseudo contour.

FIG. 3 is a block diagram showing a configuration of an image processing apparatus employing a threshold diffusion method, reducing a tone of an input value for output. Herein, there will be described an example with two types of dots used to ternarize an input image. More specifically, an image is reproduced with three states, i.e., a dot 2 corresponding to a dark dot, a dot 1 corresponding to a light dot, and no dot (or a dot 0).

With reference to the figure, the present apparatus receives as an input value a density level of a single pixel corresponding to a numerical value ranging from 0 to 1 (a multi-value) and outputs dot 0, 1 or 2.

Herein, control determines in which range an input value falls and it is binarized in each range. Herein, there are provided a range of 0 to 0.5 (a range a) and a range of 0.5 to 1 (a range b). More specifically, if an input value falls within range a of 0 to 0.5 then dot 0 or dot 1 is output and if an input value falls within range b of 0.5 to 1 then dot 1 or dot 2 is output. Thus an image is reproduced.

More specifically, with reference to FIG. 3, the image processing apparatus includes subtracters 103 and 109, a thresholding portion 105, an inversion portion 107, and a β multiplication portion 111. Subtracter 103 receives initial threshold values th1 and th2, (belonging to ranges a and b, respectively) and subtracts therefrom a correction value FB for a threshold value for a neighboring pixel (also referred to as a correction value or a feedback value) to provide a modified threshold values Mod th1 and Mod th2.

Thresholding portion 105 compares an input value with an output of subtracter 103 (a modified threshold value). If the input value is smaller than Mod th1 then 0 is output. If the input value is no less than Mod th1 and less than Mod th2 then 0.5 is output. If the input value is no less than Mod th2 then 1 is output. If thresholding portion 105 outputs 0 then dot 0 is output. If it outputs 0.5 then dot 1 is output. If it outputs 1 then dot 2 is output.

The outputs of the thresholding portion 105 are inverted by inversion portion 107. More specifically, for an input value falling within range a, if thresholding portion 105 outputs 0 then the inversion portion outputs 0.5 and if thresholding portion 105 outputs 0.5 then the inversion portion outputs 0. For an input value falling in range b, if thresholding portion 105 outputs 0.5 then inversion portion outputs 0.5 and if thresholding portion 105 outputs 1 then inversion portion outputs 0. Subtracter 109 subtracts Mod th1 from the inversion portion 107 output for an input value falling within range a and subtracter 109 subtracts Mod th2 from the inversion portion 107 output for an input value falling within range b. The subtracter 109 output is multiplied by a coefficient β to provide correction value FB for a threshold value for the pixel of interest.

FIG. 4 represents a relationship between density of image data input and density of dot. For an input in a range from 0 to 0.5, dot 1 has a density increasing from 0 to 1. For an input in a range from 0.5 to 1, dot 1 has a density decreasing from 1 to 0 and dot 2 instead has a density increasing from 0 to 1. As such, for the entirety of the image there is established a proportional relationship between an input and an output, as indicated by ③.

Furthermore, an image processing apparatus employing a threshold diffusion method may alternatively be configured as shown in FIG. 5.

With reference to FIG. 5, the image processing apparatus includes a decision portion 201 determining in which range an input value falls, a normalization portion 203 normalizing an input value to allow the input value to fall within a predetermined range, a thresholding portion 205 referring to a modified threshold value Mth to provide a thresholding process, an assignment portion 207 referring to a decision of decision portion 201 and a result of the thresholding process to assign a dot to be output, an inversion processing portion 209 inverting a result of the thresholding process, a subtracter 211 subtracting modified threshold value Mth from an output of inversion processing portion 209, a correction value memory 215 storing a result of an output of subtracter 211, a β multiplication portion 217 multiplying an output of correction value memory 215 by a coefficient β, an initial-threshold generation portion 220 generating an initial threshold value th, and a subtracter 222 subtracting an output of β multiplication portion 217 from initial threshold value th to provide modified threshold value Mth.

Note that herein an input value input is no less than zero and no more than one and an output is provided in one of the three states of 0 (no dot), out1 (equal to 0.5) and out2 (equal to 1).

If input≦out1, then decision portion 201 determines that the input value falls within range a and if out1≦input≦out2 then decision portion 201 determines that the input value falls within range b.

Normalization portion 203 receives an output of decision portion 201 and if the current input value falls within range a then normalization portion 203 outputs a value Rin=input/out1. In contrast, if the current input value falls within range b then normalization portion 203 outputs value Rin=(input-out1)/(out2-out1).

Thresholding portion 205 compares value Rin with modified threshold value Mth and if Rin≦Mth then it outputs "0" and if Rin>Mth then it outputs "1".

Assignment portion 207 refers to an output of decision portion 201 and a result of a thresholding process and if the current input value falls within range a and the result of the thresholding process is "0" then assignment portion 207 outputs "0". If the input value falls within range a and the result of the thresholding process is "1" then it outputs out1. If the input value falls within range b and the result of the thresholding process is "0" then it outputs out1. If the input value falls within range b and the result of the thresholding process is "1" then it outputs out2.

Inversion processing portion 209 outputs "1" for a thresholding result of "0" and "0" for a thresholding result of "1".

Note that while herein for the sake of simplicity an input value is 0 to 1 and it is ternarized, as in FIGS. 3 and 4, in decision portion 201 the number of ranges to be determined may further be increased to provide more than three values used to process an image.

Reference will now be made to FIG. 6 to describe an operation of the FIG. 5 apparatus. As shown in FIG. 6 at (1), an input value falls within a range of 0 to 1. Herein, if an input value is no less than 0 and less than 0.5 then decision portion 201 determines that the input value falls within range a and if an input value is no less than 0.5 and no more than 1 then decision portion 201 determines that the input value falls within range b. If an input value falls within range a, then, as shown in FIG. 6 at (2), the input value is normalized to be the range of 0 to 1. In contrast, if an input value falls within range b, then, as shown in FIG. 6 at (3), the input value is normalized to be the range of 0 to 1. Then, for either one of ranges a and b, thresholding portion 207 provides a thresholding process with modified threshold value Mth. Then, if for range a an input value normalized is no more than modified threshold value Mth then no dot (dot 0) is output and if for range a an input value normalized exceeds modified threshold value Mth then dot 1 (out1) is output.

In contrast, if for range b an input value normalized is no more than modified threshold value Mth then dot 1 (out1) is output and if for range b an input value normalized exceeds modified threshold value Mth then dot 2 (out2) is output. Thus, in FIG. 5 there can be provided a process similar to that as shown in FIGS. 3 and 4.

FIG. 7 illustrates how a correction value FB for a threshold value (a correction value or a feedback value) is diffused. With reference to the figure at (1), an input value can have a value of 0 to 1 for the sake of convenience. If an input value falls within a range of 0 to 0.5 (range a) then an initial threshold value of 0.25 is applied to determine whether dot 0 (no dot) or dot 1 is output. In contrast, if an input value falls within a range of 0.5 to 1 (range b) then an initial threshold value of 0.75 is applied to determine whether dot 1 or dot 2 is output.

If a constant input value of 0.45 is provided for any pixels, then in an initial pixel processing (1) an input value is compared in range a with the initial threshold value of 0.25. Since the input value is larger than the initial threshold value, dot 1 is output. According to the result of the thresholding process correction value FB is calculated and diffused to a neighboring pixel.

Then in a subsequent pixel processing (2) the initial threshold value minus correction value FB, i.e., a modified threshold value is compared to an input value. In the FIG. 7 process, processings (1) through (4) provide cumulative correction value FB and in processing (4) an input value is less than the modified threshold value. As such, from processings (1) through (3) dot 1 is output and in processing (4) dot 0 (no dot) is output.

Since in processing (4) correction value FB is reduced, in processing (5) an input value again exceeds the modified threshold value and dot 1 is output. Then there is provided a process similar to processing (2) and those subsequent thereto. Thus, the modified threshold value wavers around the input value of 0.45.

Reference will now be made to FIG. 8 to study a case with an input value varying from 0.45 (corresponding to no dot of 10% and dot 1 of 90%) to 0.55 (corresponding to dot 1 of 90% and dot 2 of 10%).

As shown in FIG. 8 at (1), for the input value of 0.45, correction value FB has already been accumulated for the sake of convenience. Herein, as shown in FIG. 8 at (2), if an input value has changed to 0.55 then correction value FB is handed over.

Then from processing (2) onward, dot 1 is continuously output until correction value FB having already been accumulated in processing (1) is canceled and the input value of 0.55 exceeds a modified threshold value, i.e., until processing (6).

As such, only dot 1 is output for a relatively long period (a dot is delayed), which causes a pseudo contour. For the input value of 0.55, the ratio of dot 1 to dot 2 is typically 90% to 10%. As such, essentially, for the first or second pixel dot 2 needs to be output.

Thus the present invention contemplates an image processing apparatus capable of preventing a pseudo contour with such means as described hereinafter.

The present invention in another aspect provides an image processing apparatus converting a first image signal representing a level in density of each pixel with a predetermined number of tones, successively into a second image signal with a number of tones smaller than the predetermined number of tones, including: a determiner successively receiving the first image signal for each pixel and determining a range for a level in density of each pixel; an outputter comparing the level in density of each pixel with a threshold value corresponding to the range determined, for conversion into the second image signal for output; and a corrector referring to a level in magnitude of the second image signal output from the outputter and the level in density of the first image signal to calculate a correction value correcting a threshold value to be used for processing a subsequent pixel for correction, the corrector changing a method of calculating the correction value when a range determined for the first image signal for a successively input pixel differs from a range determined for the first image signal for an immediately previously input pixel.

The present invention in still another aspect provides an image processing apparatus converting a first image signal representing a level in density of each pixel with a predetermined number of tones, successively into a second image signal with a number of tones smaller than the predetermined number of tones, including: a determiner successively receiving the first image signal for each pixel and determining a range for a level in density of each pixel; an inverter inverting a level in density of an input signal when the input signal has the level in density falling within a particular range; a normalizer normalizing the level in density of the input signal to allow the level in density of the input signal to fall within a predetermined range; a comparator comparing the level in density normalized with a threshold value to output a result by comparison; an outputter referring to a result obtained from the determiner and a result obtained from the comparator to output the second image signal with the number of tones smaller than the predetermined number of tones; and a corrector referring to the result obtained from the comparator and the threshold value to correct a threshold value to be used for processing a subsequent pixel.

The present invention in still another aspect provides an image processing apparatus converting an input signal representing a level in density of each pixel with a predetermined number of tones, into a signal with a number of tones smaller than the predetermined number of tones, including: an outputter outputting a value serving as a basis for a threshold calculation; a threshold calculator using the basis for the threshold calculation to calculate at least two threshold values; a thresholder referring to the at least two threshold values to threshold the input signal; and a corrector referring to a result obtained from the thresholder and the value serving as the basis for the threshold calculation, to correct a value serving as a basis for a threshold calculation to be used for processing a subsequent pixel.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIGS. 1 and 2 illustrate how a pseudo contour is created in an error diffusion method;

FIG. 5 is a block diagram showing another example of a configuration of an image processing apparatus employing a threshold diffusion method;

FIG. 6 represents an operation of the FIG. 5 apparatus;

FIG. 10 represents an operation of the FIG. 9 apparatus;

FIG. 16 represents an operation of the FIG. 14 apparatus;

FIG. 18 is a first diagram representing a modification of the control shown in FIG. 15;

FIG. 19 is a second diagram showing a modification of the control shown in FIG. 15;

FIG. 30 represents an operation of the FIG. 29 apparatus;

FIG. 31 is a block diagram showing a configuration of an image processing apparatus employing a threshold diffusion method.

DESCRIPTION OF THE PREFERRED EMBODIMENTS

First Embodiment

Figure 9:
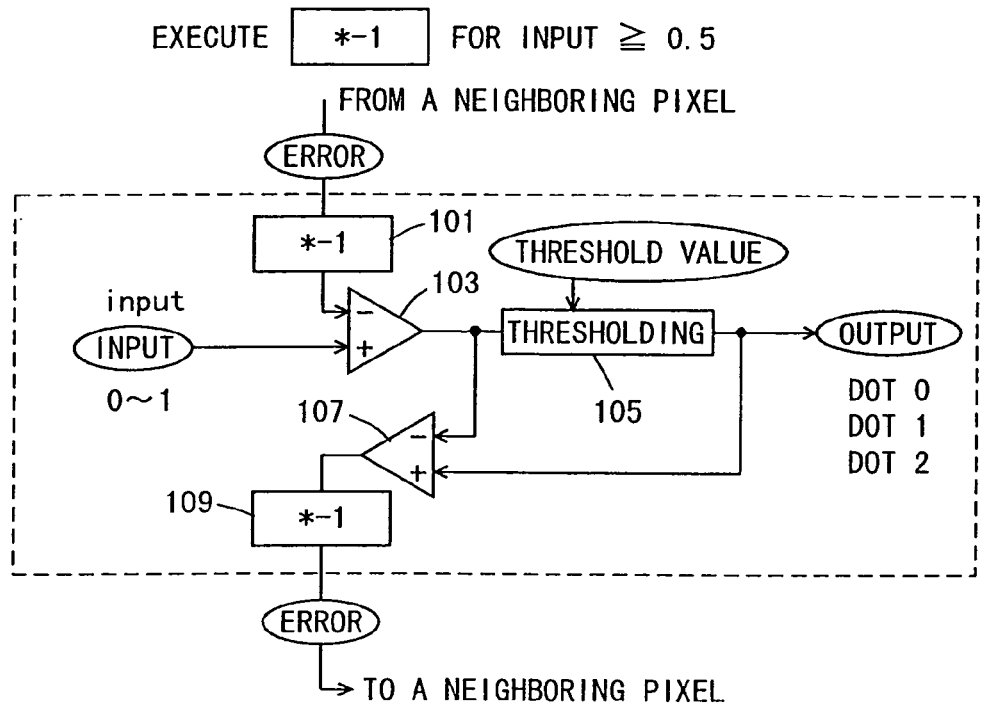
FIG. 9 is a block diagram showing a configuration of an image processing apparatus in a first embodiment of the present invention.

FIG. 9 is a block diagram showing a configuration of an image processing apparatus in a first embodiment of the present invention.

Figure 27:
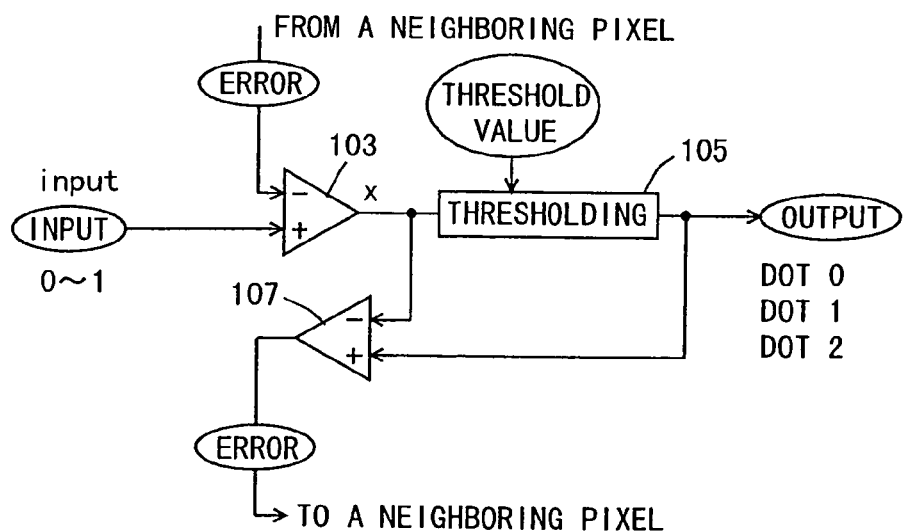
FIG. 27 is a block diagram showing a configuration of an image processing apparatus employing a conventional error diffusion method.

The present image processing apparatus is basically identical in configuration to the image processing apparatus as shown in FIG. 27. The present apparatus is distinguished from the FIG. 27 apparatus in that it includes an inversion portion 101 inverting a sign of an error from a neighboring pixel and an inversion portion 109 inverting a sign of an error calculated by subtracter 107.

Inversion portions 101 and 109 both provide a multiplication by −1 for an input value of no less than 0.5. Inversion portions 101 and 109 do nothing for an input value of less than 0.5.

More specifically, when a range to which an input value belongs is switched, an error is calculated in a different method. (More specifically, an error has its sign inverted.)

As such, if input values are 0.5 to 1 and they do thus not have any other value, then when a subtraction portion 107 is to send an error to another pixel the error is multiplied by −1 and when an error is taken in inversion portion 101 multiplies the error again by −1. Thus, an error has a sign cancelled and a process is provided according to an error diffusion method normally. In contrast, if input values are 0 to 0.5 and they do thus not have any other value then inversion portions 101 and 109 do nothing. As such, it is needless to say that a process can be provided according to an error diffusion method normally. If an input value transitions from a range smaller than 0.5 to a range larger than 0.5 or vice versa, then an error has its sign inverted. As such, there can be prevented a pseudo contour attributed to delayed generation of a dot.

FIG. 10 is a diagram for illustrating an operation of the FIG. 9 image processing apparatus.

With reference to FIG. 10 at state (1), an input value is 0.45 and an error has been accumulated downward (in the negative direction) for the sake of convenience. Then in state (2) if an input value exceeds 0.5 and reaches 0.55 then inversion portions 101 and 109 invert a sign of an error. Thus, an error has an upward or positive direction. As such, dot 2 is immediately output.

This also applies to an input value transitioning from a value exceeding 0.5 to a value less than 0.5. Such a process as described above can prevent delay of a dot to prevent a pseudo contour.

Figure 11:
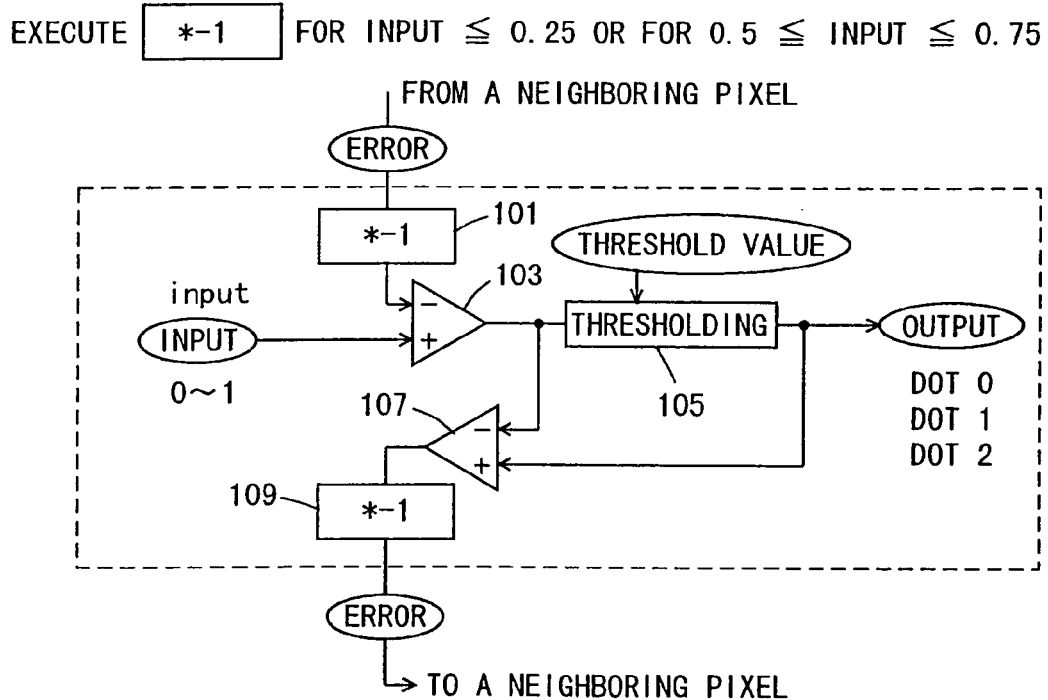
FIG. 11 is a block diagram showing a modification of the FIG. 9 apparatus.

FIG. 11 is a block diagram showing a modification of the FIG. 9 image processing apparatus. The present apparatus has inversion portions 101 and 109 both providing a multiplication by −1 for an input value of no more than 0.25 or an input value of no less than 0.5 and no more than 0.75. More specifically, in the present embodiment, an error has its sign inverted not only when an input value varies across a range but also when it varies across a threshold value. Thus inverting an error at a minute level can alleviate the exact delay of a dot.

Note that the FIG. 11 apparatus is also applicable for a binarization process. In other words, in a binarization process when an input varies across a threshold value an error can also have its sign inverted to prevent a pseudo contour.

Second Embodiment

Figure 12:
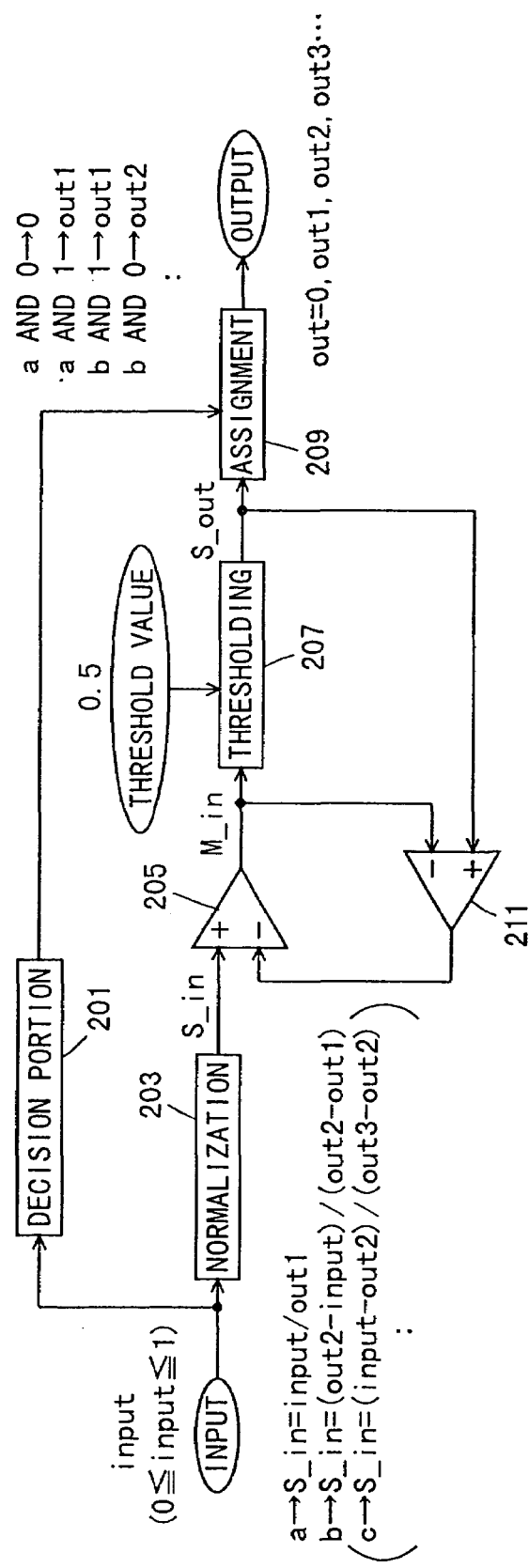
FIG. 12 is a block diagram showing a configuration of an image processing apparatus in a second embodiment of the present invention.
Figure 29:
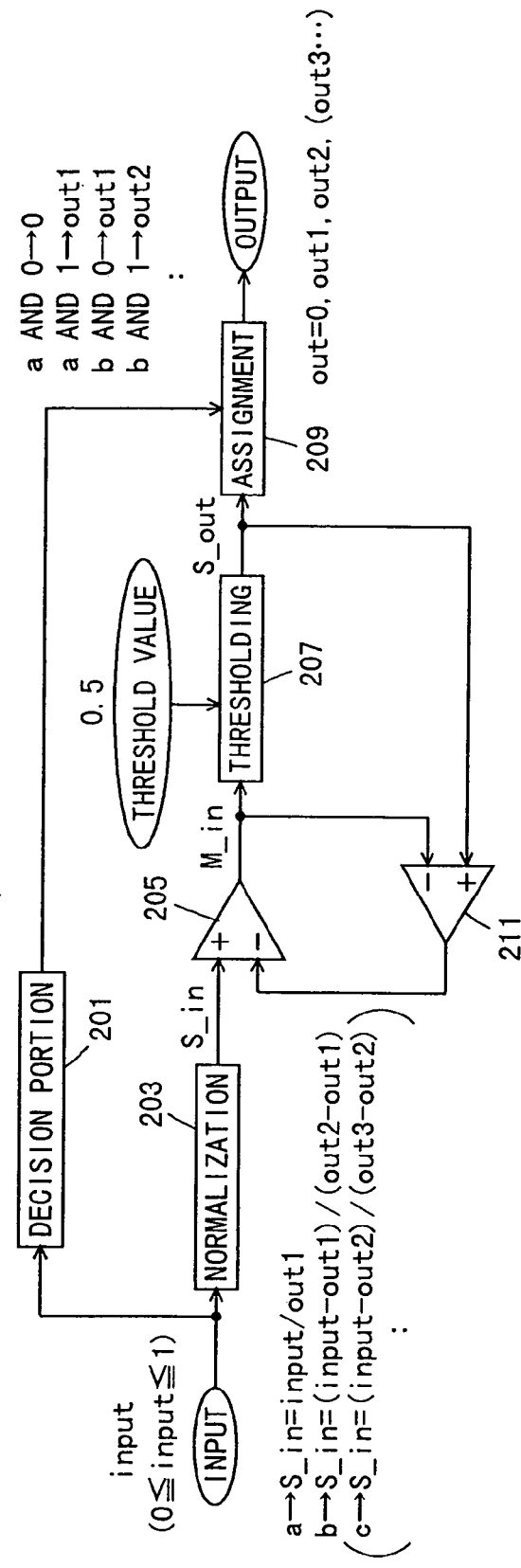
FIG. 29 shows another configuration of an image processing apparatus employing an error diffusion method.
Figure 32:
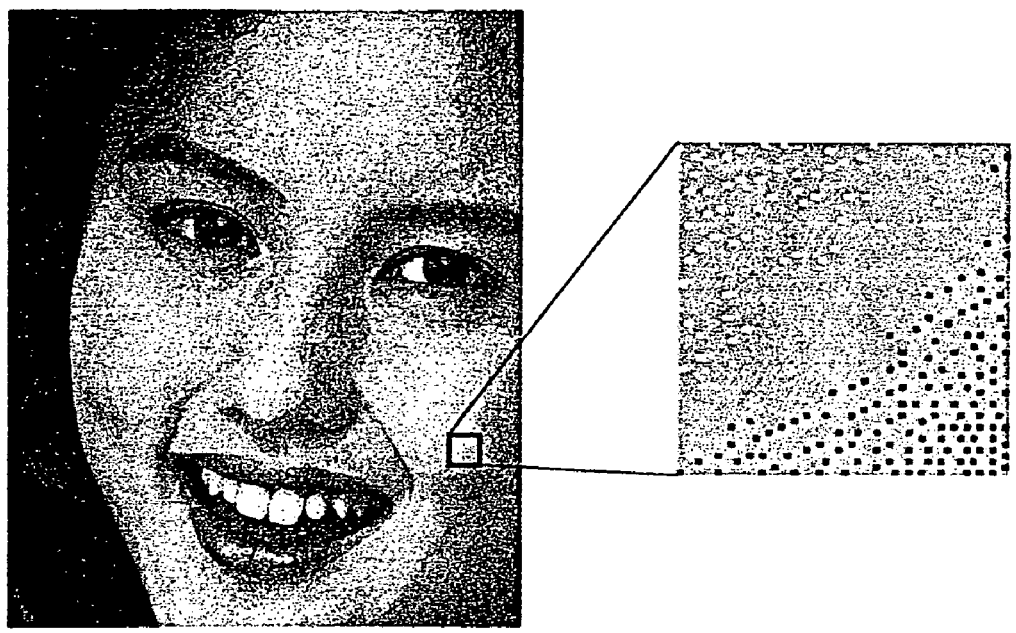
FIG. 32 shows a pseudo contour created in conventional art.

FIG. 12 is a block diagram showing a configuration of an image processing apparatus in a second embodiment of the present invention. The present image processing apparatus is basically the same in configuration as the FIG. 29 image processing apparatus. In the present embodiment, however, when an input value falls within a specific range (more specifically, range b) the input value is inverted in level and also normalized. Furthermore, assignment portion 209 also provides an assignment considering a result of an inversion in level of an input value.

Figure 13:
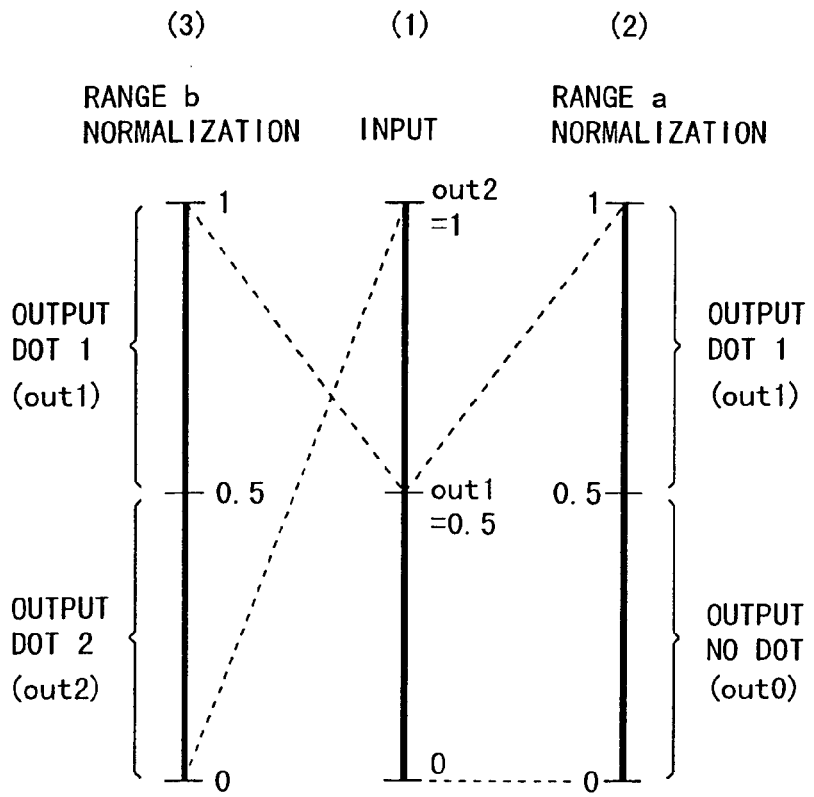
FIG. 13 represents an operation of the FIG. 12 apparatus.

More specifically, with reference to FIG. 13, if in the present image processing apparatus an input value falls within range a (or the input value is 0 to 0.5) then there is provided a process similar to the FIG. 30 process. However, if an input value falls within range b (or the input value is 0.5 to 1) then the input value is inverted in level and normalized. Then the normalized value is thresholded and if the normalized value is then 0 to 0.5 then dot 2 is output and if the normalized value is then 0.5 to 1 then dot 1 is output. As such, as in FIG. 10, when an input value varies across 0.5 an error can have its sign inverted to prevent delay of a dot to prevent a pseudo contour.

Third Embodiment

Figure 14:
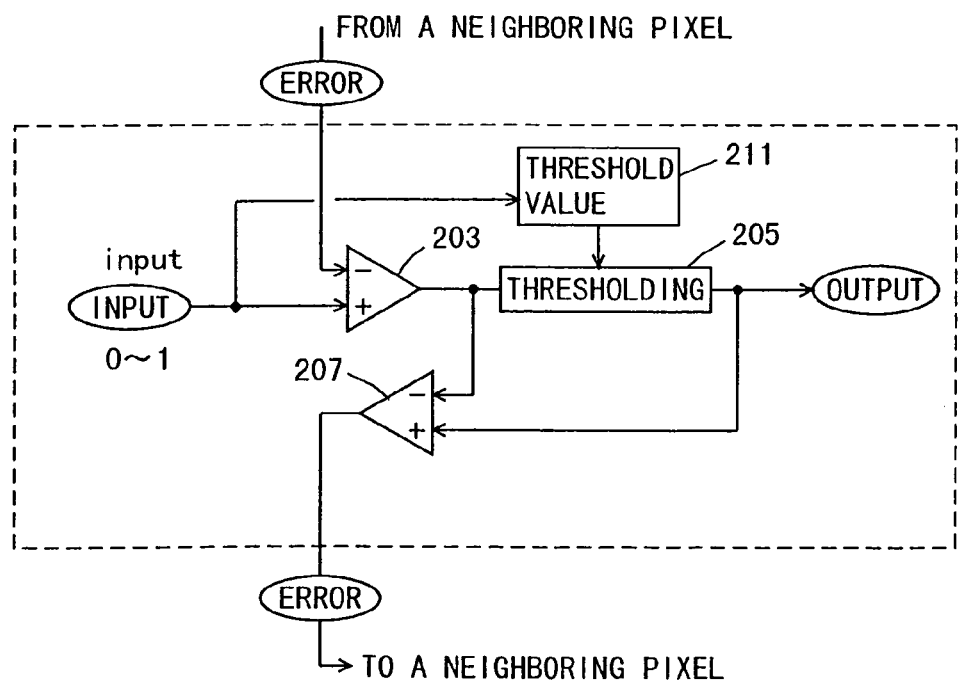
FIG. 14 is a block diagram showing a configuration of an image processing apparatus in a third embodiment of the present invention.

FIG. 14 is a block diagram showing a configuration of an image processing apparatus in a third embodiment of the present invention. The present image processing apparatus is basically the same in configuration as the conventional image processing apparatus shown in FIG. 27, except that the present image processing apparatus includes a threshold control portion 211 controlling a threshold value to allow ranges a and b at their boundary to have their respective threshold values substantially in succession.

Figure 15:
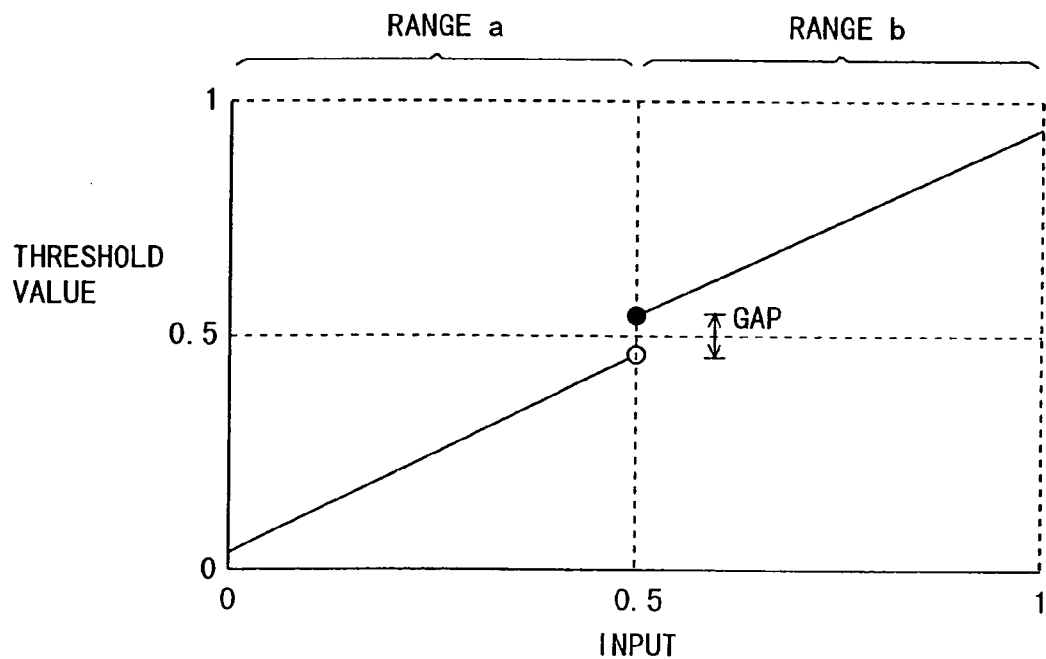
FIG. 15 represents an operation of a threshold control portion 211 shown in FIG. 14.

FIG. 15 represents a threshold value output from threshold control portion 211 shown in FIG. 14. Threshold control portion 211 allows a threshold value to vary as an input value varies. More specifically, it controls a threshold value to increase whenever an input value increases. It provides control to provide a small gap (of approximately 0.1 to 0.2) between ranges a and b between a threshold value of range a and a threshold value of range b. Providing their respective threshold values substantially in succession as above can reduce an absolute value of an error in a vicinity of a boundary of ranges a and b. Furthermore, a threshold value varying in proportion to an input value effectively allows an error to have an absolute value constantly maintained small. As such, there can be prevented a pseudo contour attributed to delay of a dot. Furthermore, even if a threshold value is changed as described above, image data input can have a density represented by an error diffusion method accurately.

FIG. 16 is a diagram for illustrating an operation of the image processing apparatus shown in FIGS. 14 and 15. In state (1), when an input value is 0.45 the threshold value is approximately 0.4. As such, as shown in states (2) to (7), if an input value is constantly 0.45 and does not vary then the input value minus an error falls around 0.4. In other words, an error has an absolute value reduced to a small value. As a result, if an input value has been changed for example from 0.45 to 0.55 a dot is hardly delayed.

Figure 17:
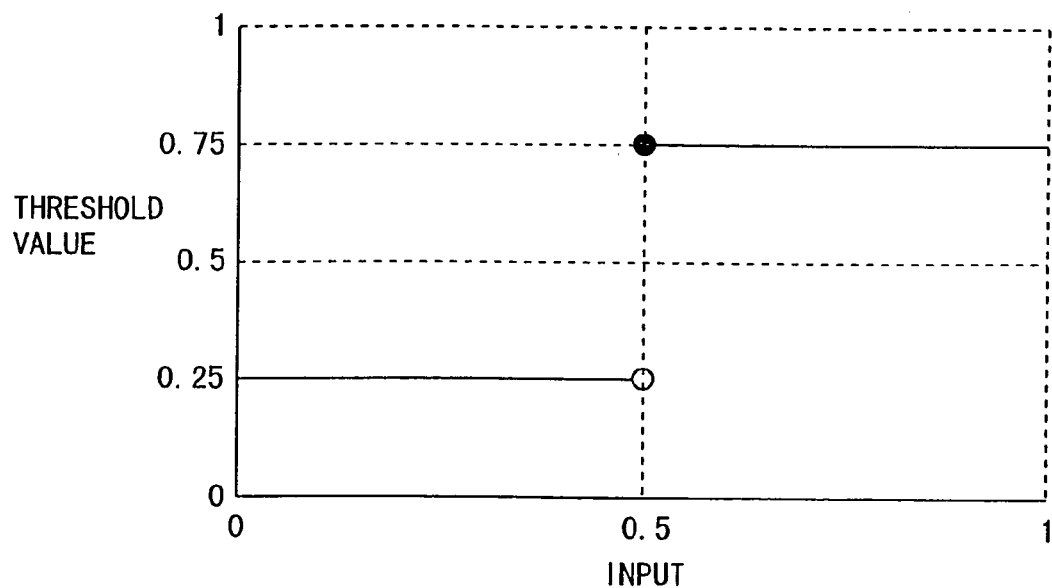
FIG. 17 illustrates a threshold value of an image processing apparatus employing a conventional error diffusion method.

More specifically, with reference to FIG. 17, in a conventional error diffusion method a threshold value is fixed for each range regardless of the input value of interest and there also exists a large gap on a boundary of the ranges between their respective threshold values. As such, as shown in FIG. 2, an error has an increased absolute value and a dot thus readily delays. In contrast, in the present embodiment, as shown in FIG. 15, control is provided to allow ranges at a boundary thereof to have their respective threshold values substantially in succession to prevent delay of a dot.

Note that a threshold value may be controlled as shown in FIG. 18 to allow ranges at a boundary thereof to have their respective threshold values in succession. Thus controlling a threshold value can also prevent delay of a dot and hence occurrence of a pseudo contour.

Furthermore, if ranges at a boundary thereof have their respective threshold values with a small gap therebetween (for example of approximately 0.1 to 0.2), a threshold value may be controlled to be fixed for each range, as shown in FIG. 19.

Fourth Embodiment

Figure 20:
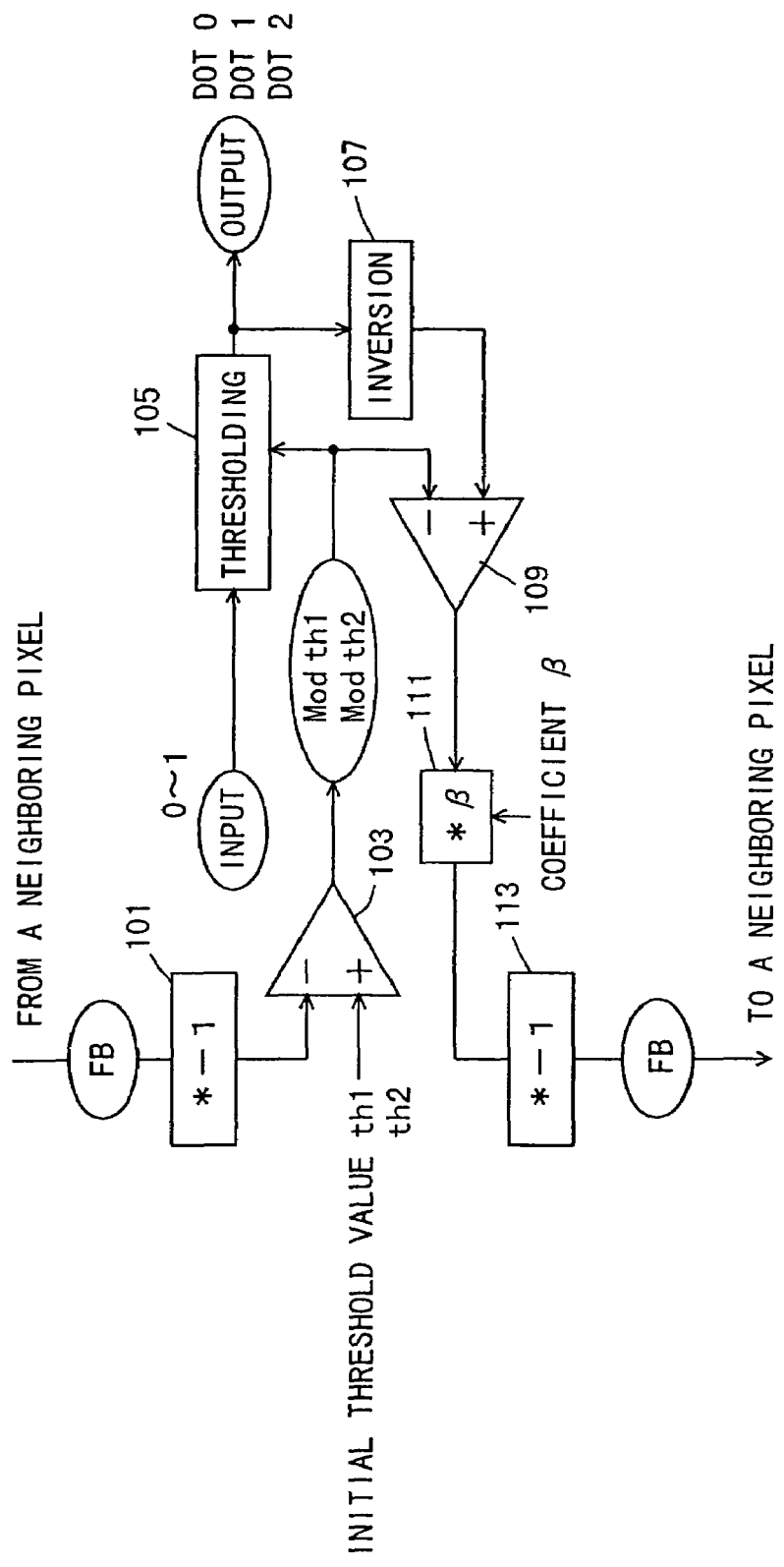
FIG. 20 is a block diagram showing a configuration of an image processing apparatus in a fourth embodiment of the present invention.

FIG. 20 is a block diagram showing a configuration of an image processing apparatus in a fourth embodiment of the present invention.

Figure 3:
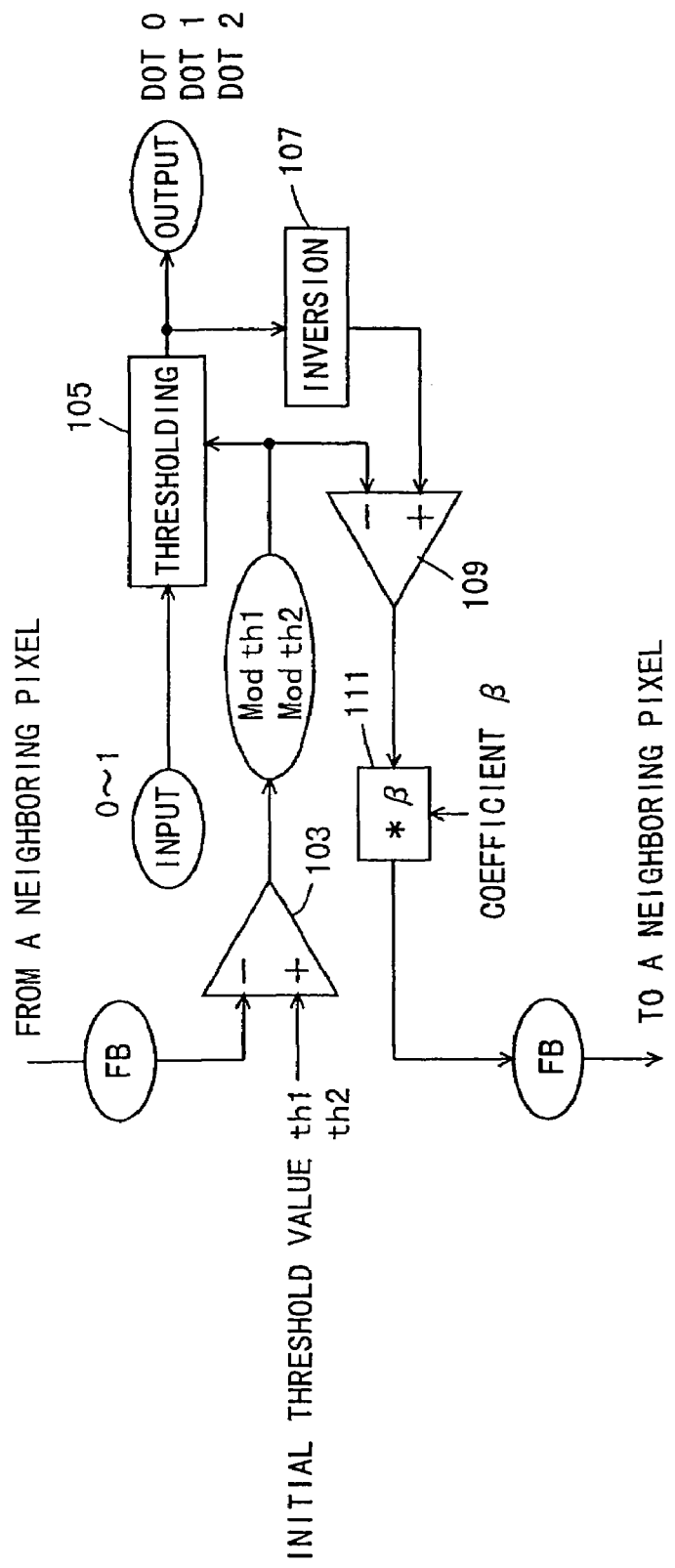
FIG. 3 represents an algorithm of a threshold diffusion method.
Figure 4:
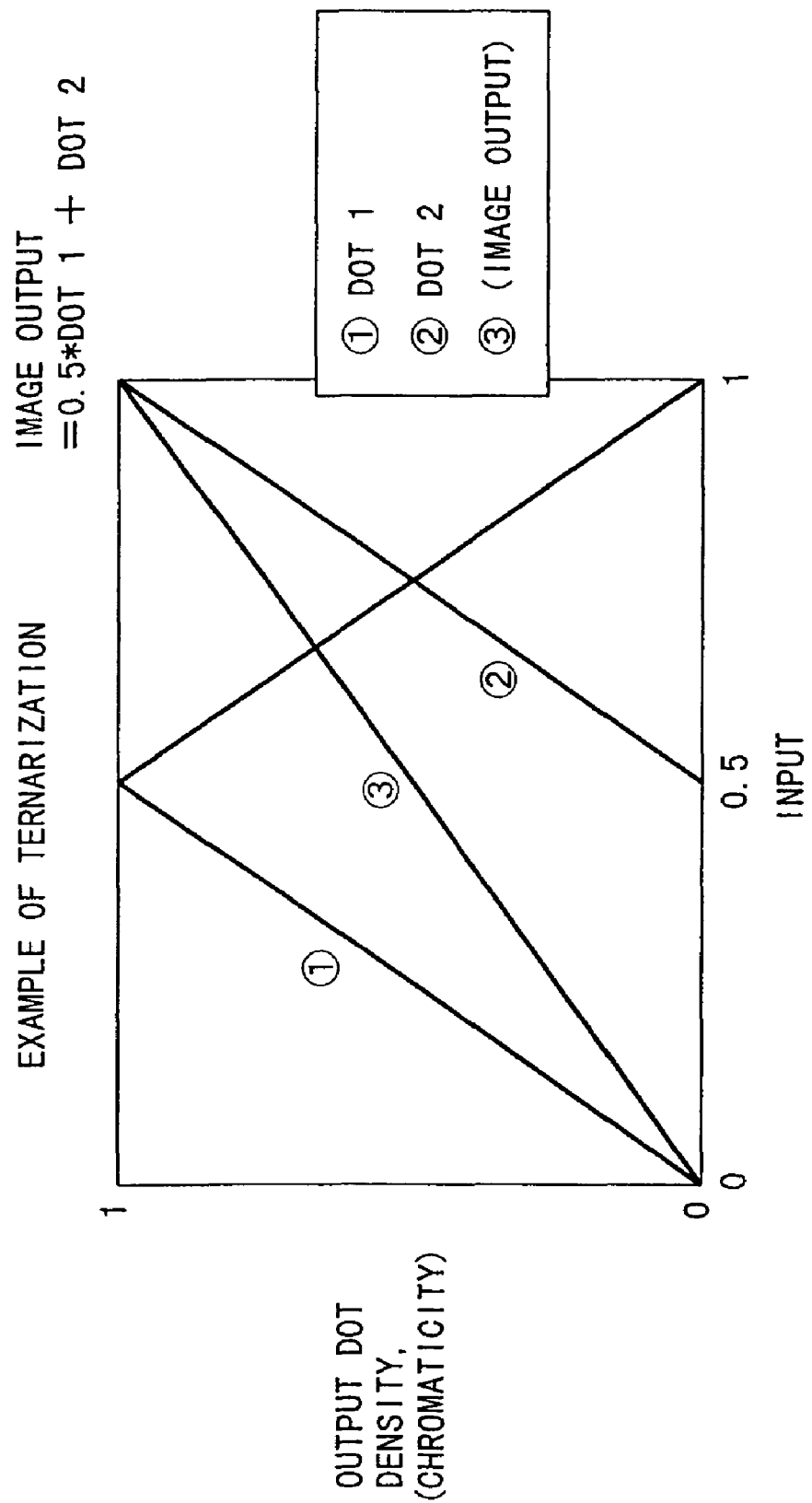
FIG. 4 illustrates an operation of the FIG. 3 apparatus.
Figure 7:
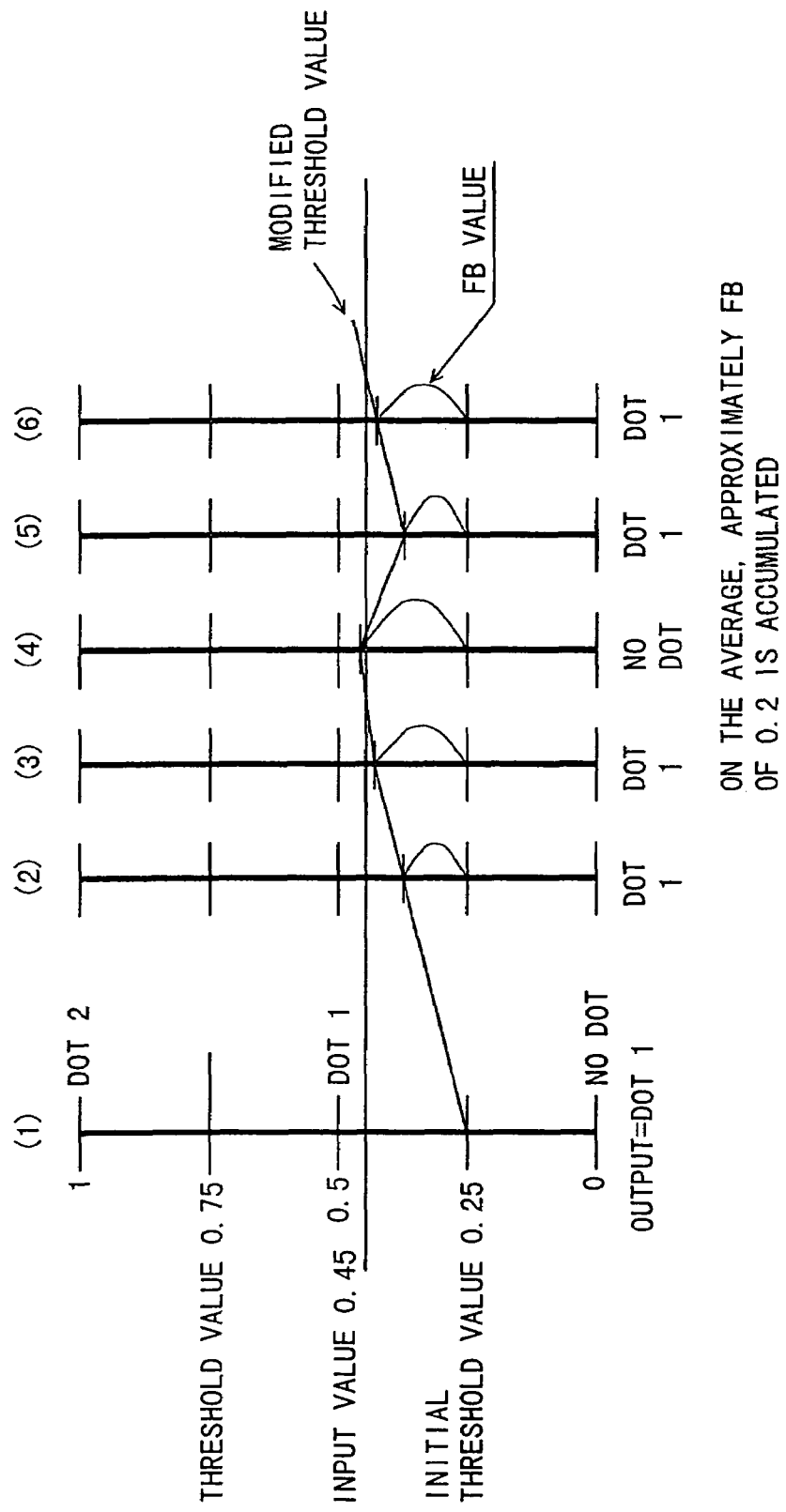
FIG. 7 illustrates an operation of an image processing apparatus employing a threshold diffusion method.
Figure 8:
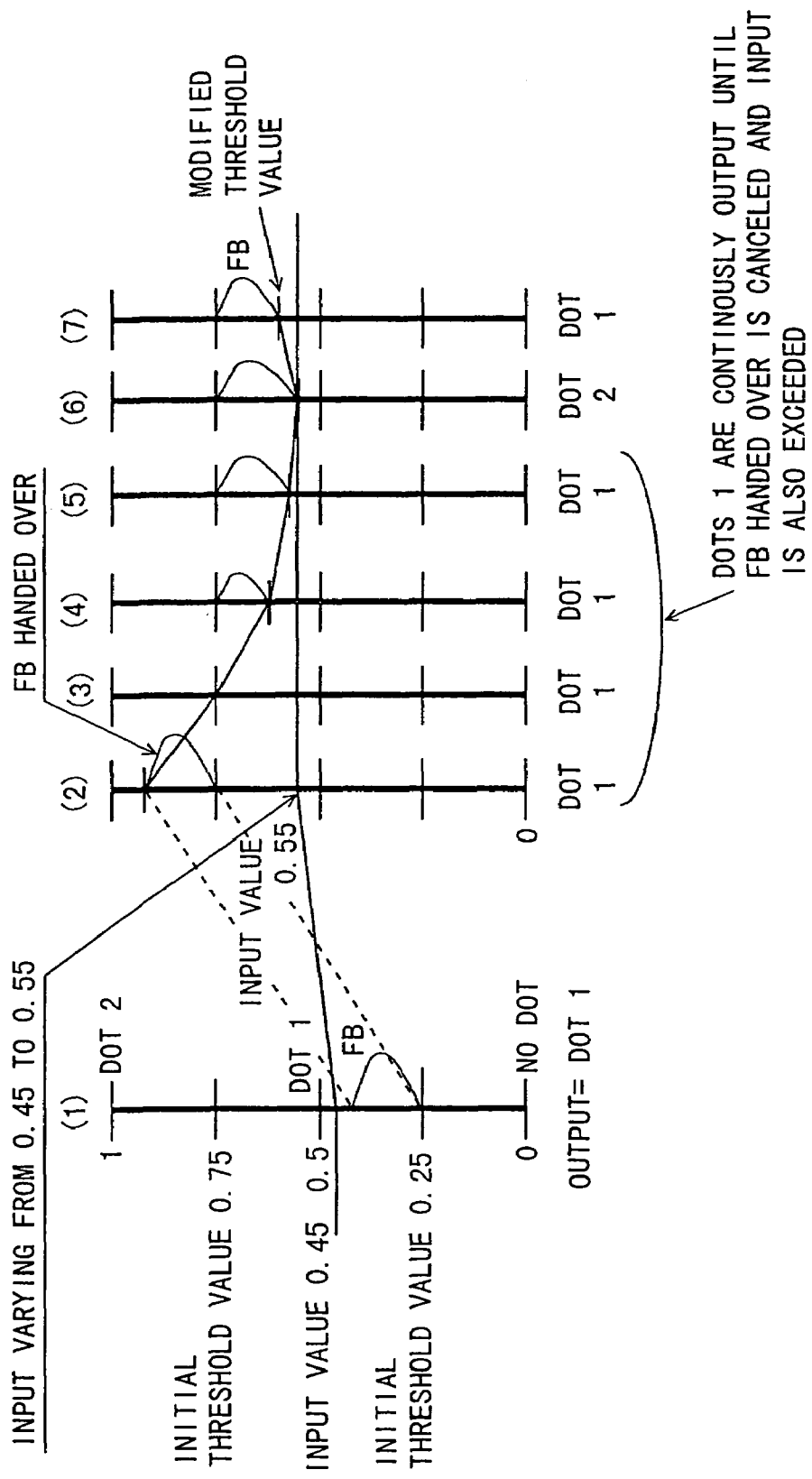
FIG. 8 illustrates a mechanism permitting a pseudo contour to occur.

The present image processing apparatus is basically the same in configuration as the FIG. 3 image processing apparatus, except that the present image processing apparatus includes an inversion portion 101 inverting a sign of correction value FB from a neighboring pixel and an inversion portion 113 inverting a sign of an output of β multiplication portion 111.

Inversion portions 101 and 113 both provide a multiplication by −1 for an input value of no less than 0.5. Inversion portions 101 and 113 do nothing for an input value less than 0.5.

In other words, a method of calculating a correction value changes (more specifically, a correction value has its sign inverted) when a range to which an input value belongs is switched to a different range.

As such, if input values are not any other value than 0.5 to 1, then when β multiplication portion 111 is to send a correction value to another pixel correction value FB is multiplied by −1 and when a correction value is taken in inversion portion 101 multiplies correction value FB again by −1. As such, a correction value has its sign canceled and a process is provided according to a threshold diffusion method normally. If input values are 0 to 0.5 and do not have any other value then inversion portions 101 and 109 do nothing. As such, it is needless to say that a process can be provided according to a threshold diffusion method normally. When an input value varies from a range smaller than 0.5 to a range larger than 0.5 or vice versa, a correction value has its sign inverted. As such, there can be prevented a pseudo contour attributed to delayed generation of a dot.

Figure 21:
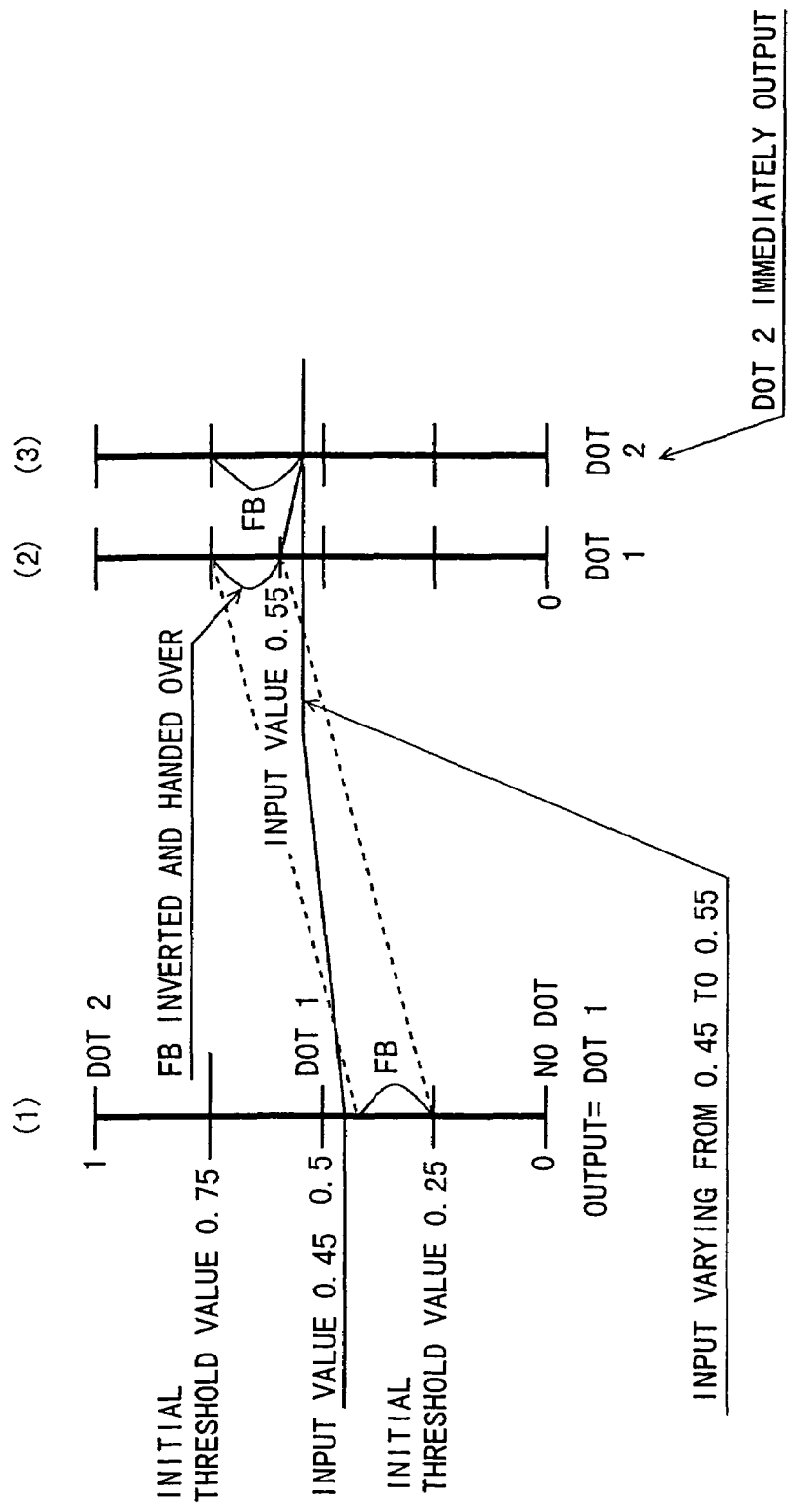
FIG. 21 illustrates an effect of the FIG. 20 apparatus.

FIG. 21 is a diagram for illustrating an operation of the FIG. 20 image processing apparatus.

With reference to the figure at state (1) an input value is 0.45 and correction value FB has been accumulated upward (in the positive direction) for the sake of convenience. Then in state (2) if an input value exceeds 0.5 and reaches 0.55 then inversion portions 101 and 109 invert a sign of correction value FB. Thus, correction value FB has a downward or negative direction. Thus, dot 2 is immediately output.

This also applies to an input value varying from a value exceeding 0.5 to a value less than 0.5. Thus, a dot can be generated without delay to prevent a pseudo contour.

Figure 22:
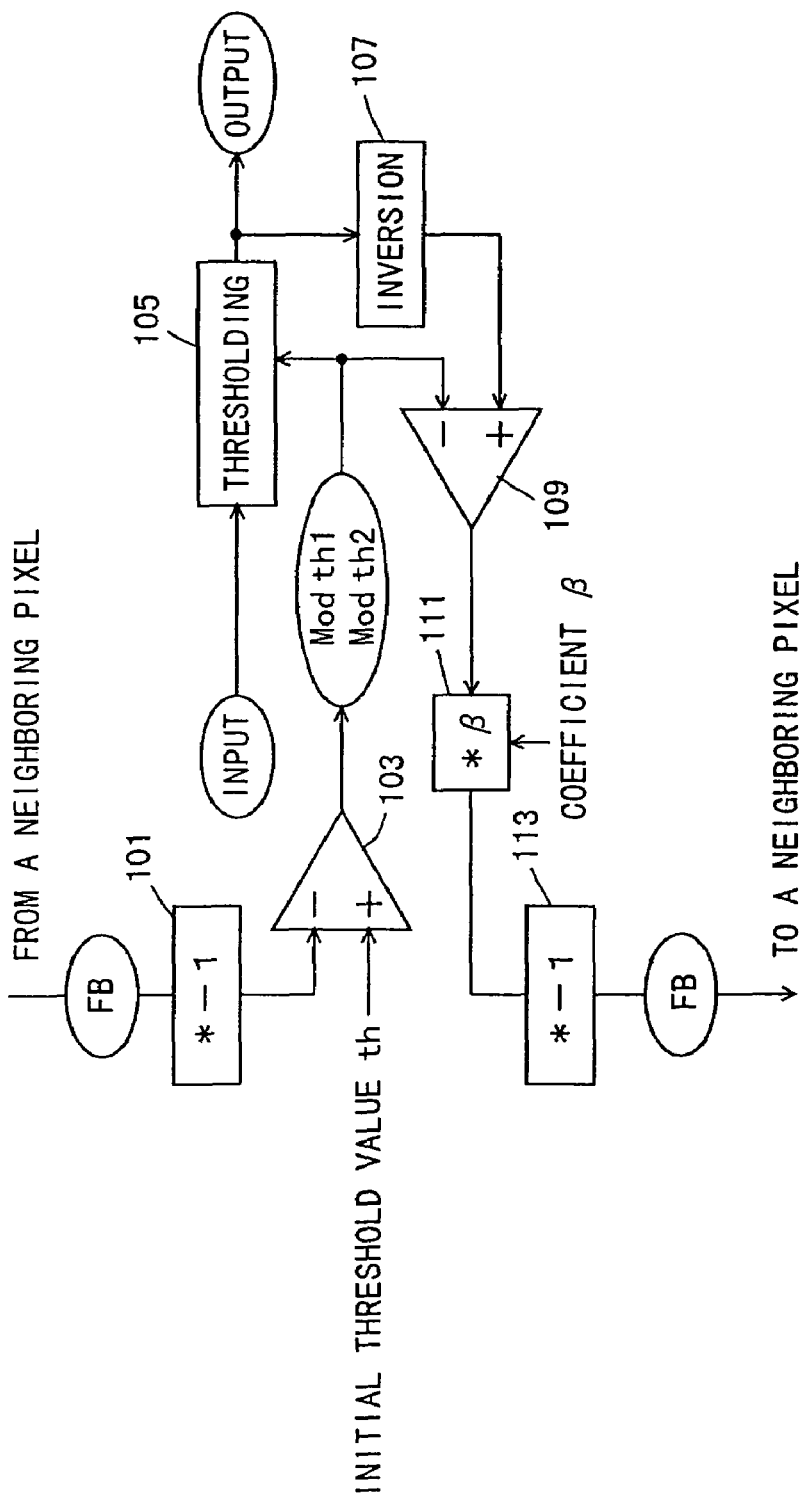
FIG. 22 is a block diagram showing a configuration of the image processing apparatus in the fourth embodiment.

FIG. 22 is a block diagram showing a modification of the FIG. 20 image processing apparatus. The present apparatus has inversion portions 101 and 113 both providing a multiplication by −1 for an input value of no more than 0.25 or an input value of no less than 0.5 and no more than 0.75. More specifically, in the present embodiment, correction value FB has its sign inverted not only when an input value varies across a range but also when an input value varies across a threshold value (an initial threshold value). Thus inverting a correction value at a minute level can also alleviate that delay of a dot attributable to an input value varying across a threshold value.

Note that the FIG. 22 apparatus is also applicable to a binarization process. More specifically, in a binarization process when an input varies across a threshold value an error can have its sign inverted to prevent delay of a dot.

Fifth Embodiment

Figure 23:
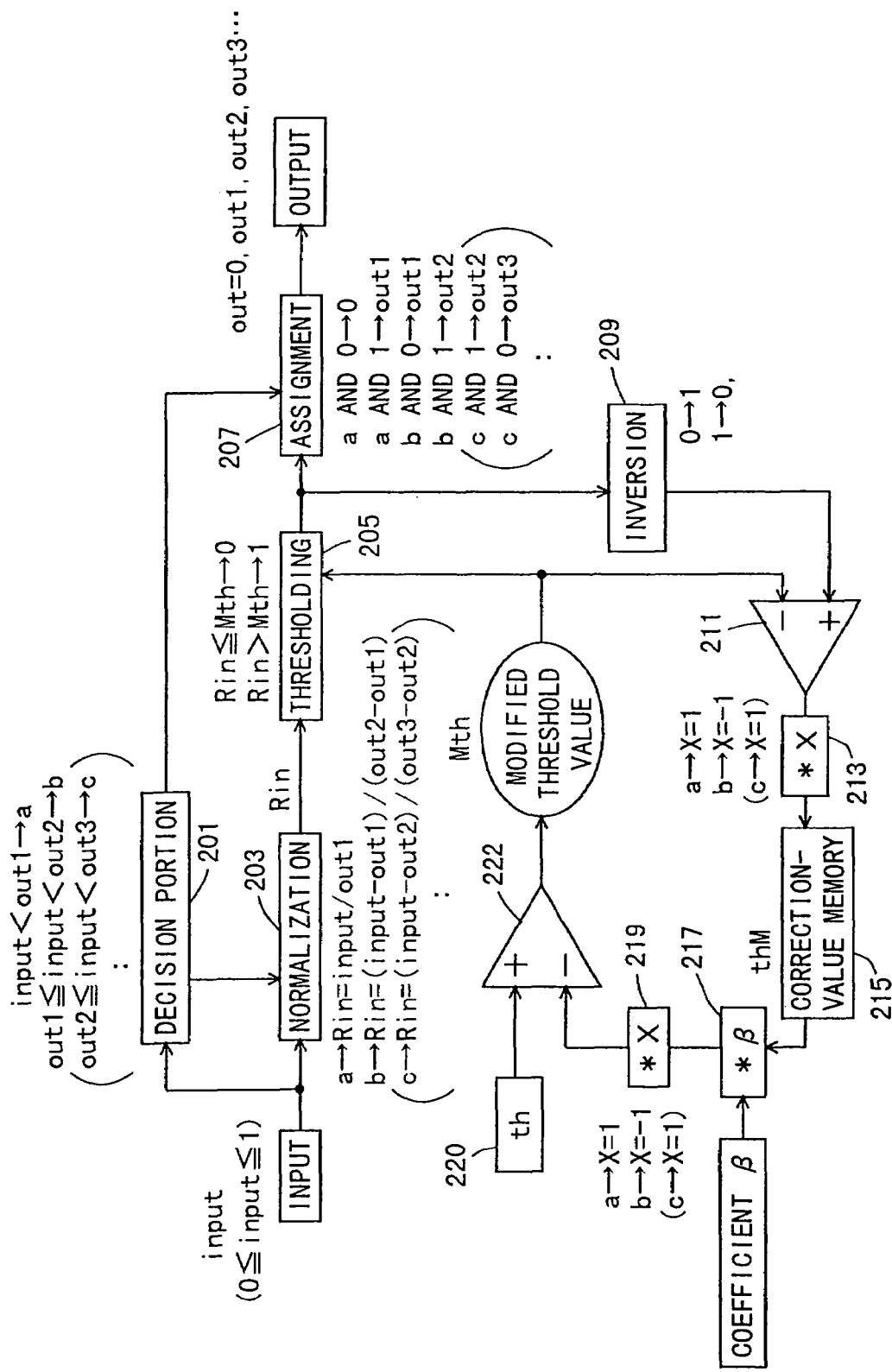
FIGS. 23 and 24 are block diagrams showing configurations of image processing apparatuses in fifth and sixth embodiments of the present invention, respectively.

FIG. 23 is a block diagram showing a configuration of an image processing apparatus in a fifth embodiment of the present invention. The present image processing apparatus is basically the same in configuration as the FIG. 5 image processing apparatus, except that the present image processing apparatus includes an inversion portion 213 inverting a sign of an output of a subtracter 211 and an inversion portion 219 inverting a sign of an output of a β multiplication portion 217.

Inversion portions 213 and 219 both provide a multiplication by −1 when an input value falls within range b. In contrast, if an input value falls within range a then inversion portions 211 and 219 provide a multiplication by one. As such, as in the fourth embodiment, when a range that an input value falls within is switched to a different range there also changes a method of calculating a correction value. A pseudo contour can be prevented as well as in the fourth embodiment.

Sixth Embodiment

Figure 24:
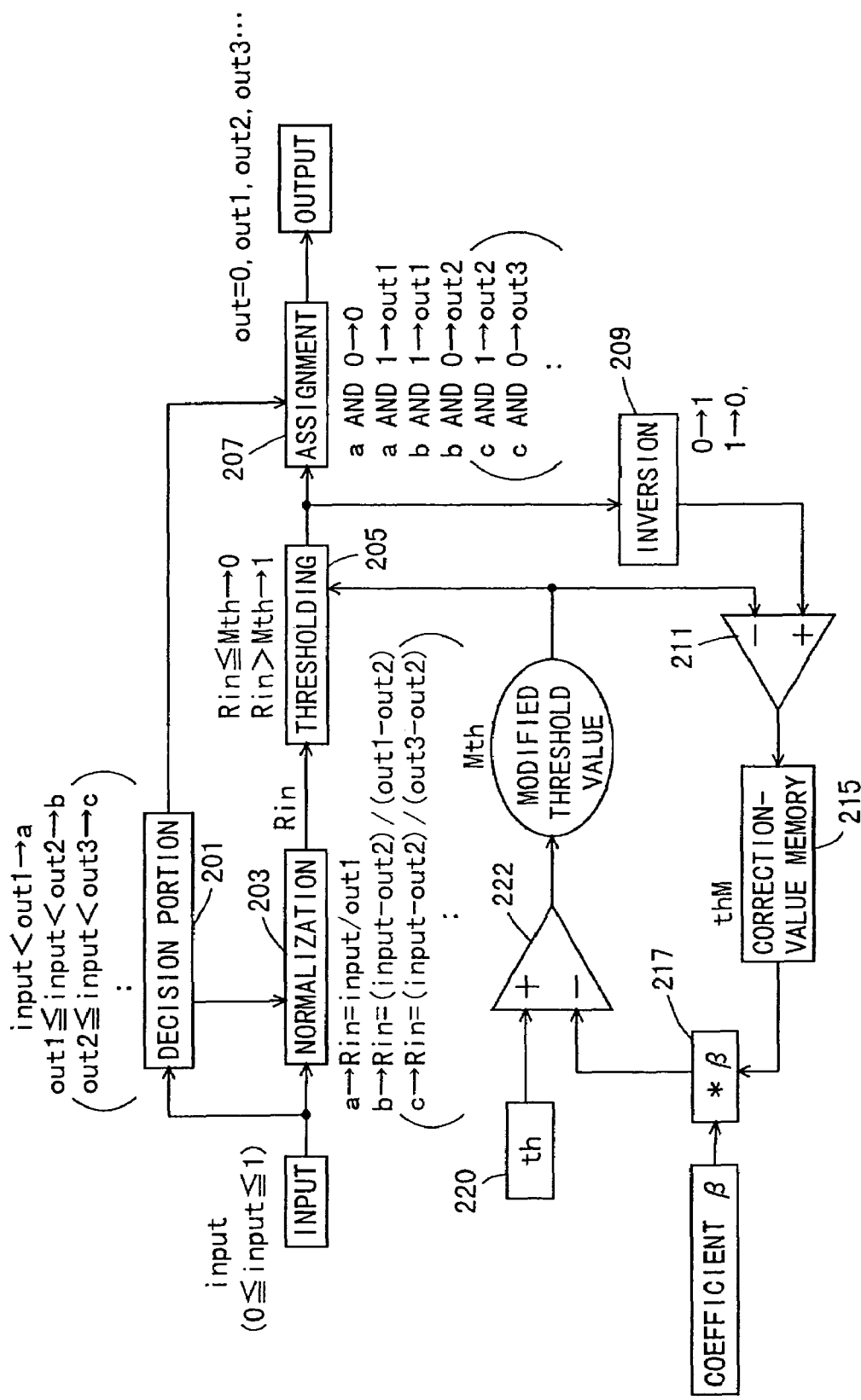

FIG. 24 is a block diagram showing a configuration of an image processing apparatus in a sixth embodiment of the present invention. The present image processing apparatus is basically the same in configuration as the FIG. 5 apparatus, except that in the present embodiment when an input value falls within a specific range (more specifically, range b) the input value is inverted in level and normalized. Furthermore, assignment portion 207 also provides an assignment considering a result of an inversion of an input value in level.

More specifically, if an input value falls within range a then normalization portion 203 provides the same process as the FIG. 5 process. If an input value falls within range b, however, it provides a process to output a value of Rin= (input−out2)/(out1−out2). This process inverts an input value in level and normalizes the same if the input value falls within range b.

Assignment portion 207 outputs out1 if an input value falls within range b and a thresholding process provides a result of "1", and assignment 207 outputs out2 if an input value falls within range b and a thresholding process provides a result of "0".

Figure 25:
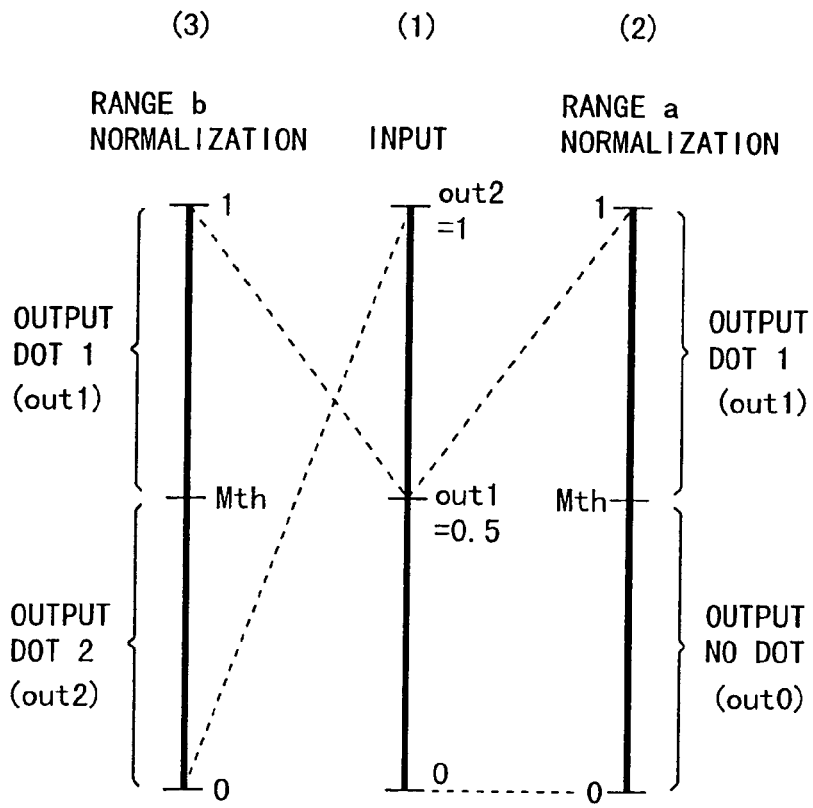
FIG. 25 represents an operation of the FIG. 24 apparatus.

More specifically, with reference to FIG. 25, if an input value falls within range a (it is 0 to 0.5) then the present image processing apparatus provides a process similar to the FIG. 6 process. If an input value falls within range b (it is 0.5 to 1), however, the input value is inverted in level and normalized. The normalized value is thresholded and if the normalized value is 0 to Mth then dot 2 is output and if the normalized value is Mth to 1 then dot 1 is output. Thus, a dot can be free of delay to prevent a pseudo contour, as well as in the above embodiments.

Seventh Embodiment

Figure 26:
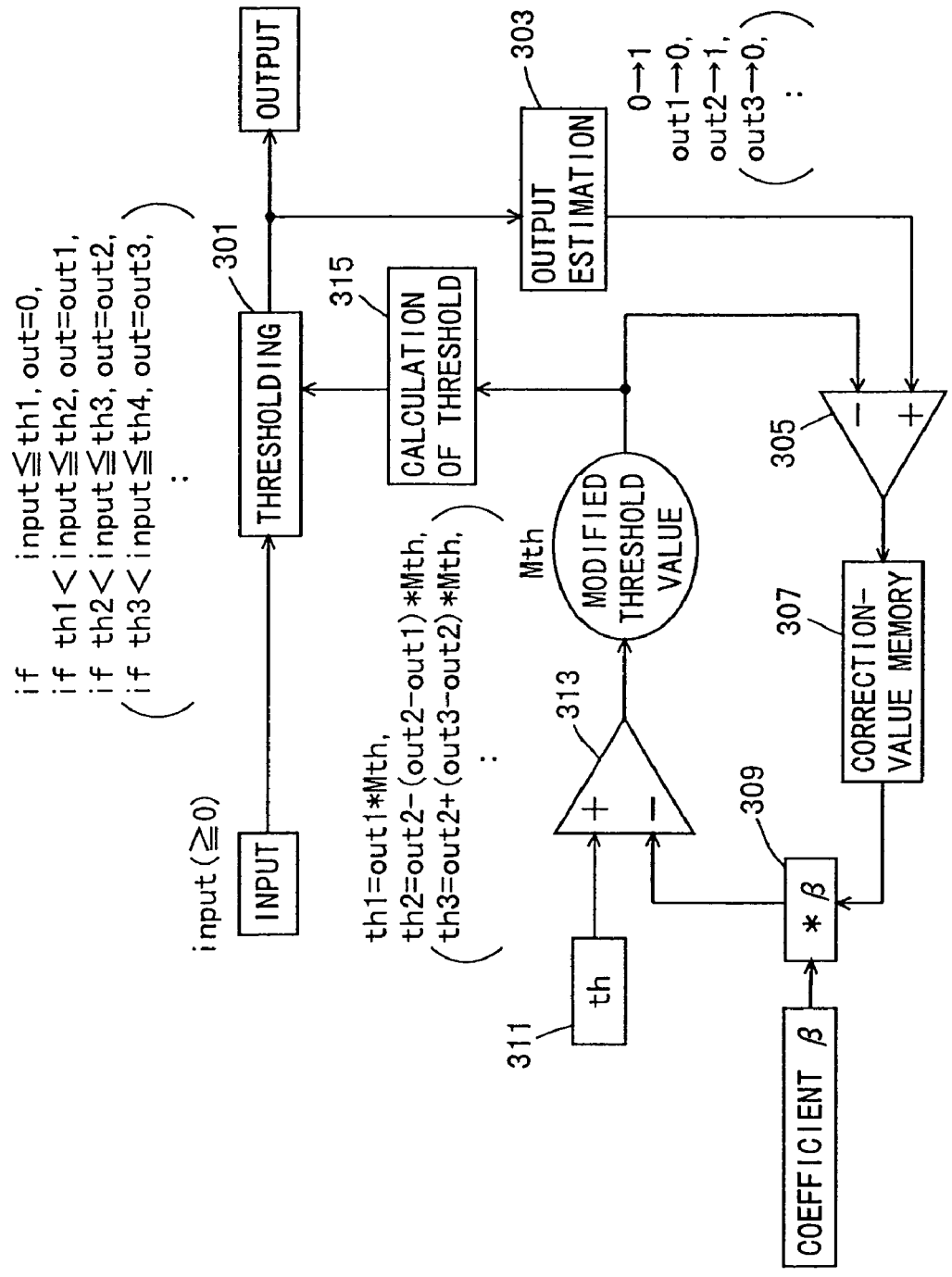
FIG. 26 is a block diagram showing a configuration of an image processing apparatus in a seventh embodiment of the present invention.
Figure 28:
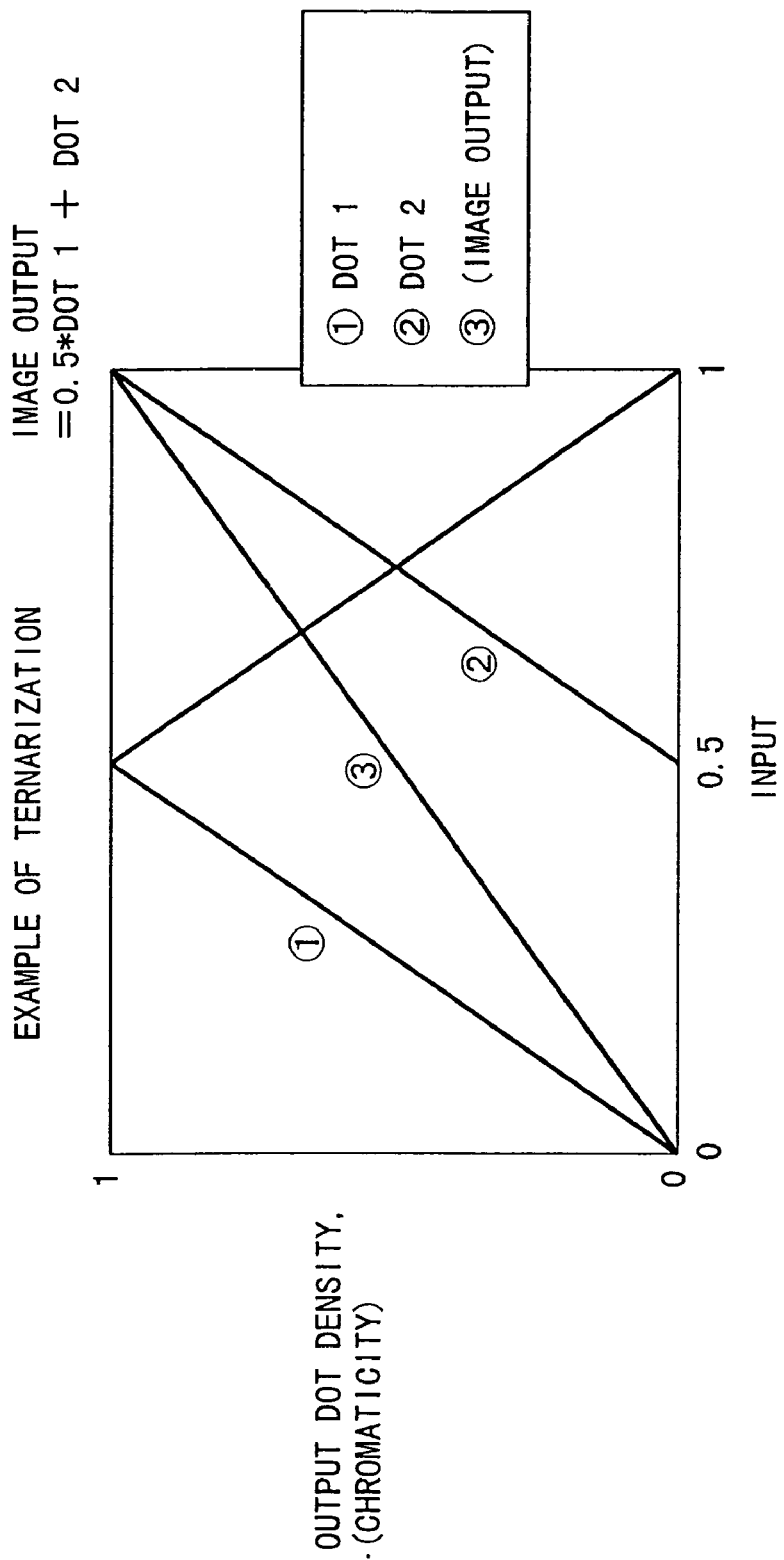
FIG. 28 represents an operation of the FIG. 27 apparatus.

FIG. 26 is a block diagram showing a configuration of an image processing apparatus in a seventh embodiment of the present invention. With reference to the figure, the image processing apparatus includes a thresholding portion 301 thresholding an input value, an output estimation portion 303 referring to a result of a thresholding process to estimate an output, a subtracter 305 subtracting modified threshold value Mth from an output of output estimation portion 303, a correction-value memory 307 temporarily storing an output of subtracter 305, β multiplication portion 309 multiplying an output of correction-value memory 307 by coefficient β, an initial-threshold generation portion 311 generating initial threshold value th, a subtracter 313 subtracting an output of β subtraction portion 309 from the initial threshold value, and a threshold calculation portion 315 calculating a threshold value based on an output (modified threshold value Mth) of subtracter 313.

In the present embodiment, modified threshold value Mth serves as a basis for calculating a threshold value and threshold calculation portion 315 uses modified threshold value Mth to calculate at least two threshold values which are in turn used by thresholding portion 301 to threshold an input value.

A processing result obtained from thresholding portion 301 and modified threshold value Mth are used to correct modified threshold value Mth to be used for a subsequent pixel processing.

More specifically, threshold calculation portion 315 uses modified threshold value Mth and output values out1 and out2 to calculate threshold values th1 and th2, as follows:

$$th1 = out1 \times Mth$$

$$th2 = out2 - (out2 - out1) \times Mth$$

Thresholding portion 301 outputs 0 for input≦th1 and out1 for th1<input≦th2. Furthermore, it outputs out2 for th2<input≦th3, wherein th3=out2.

Output estimation portion 303 outputs "1" for a thresholding result of 0, "0" for a thresholding result of out1, and "1" for a thresholding result of out2.

The present embodiment provides a process to increase the threshold value th1 value and decrease the threshold value th2 in value as modified threshold value Mth increases in value. As such, as well as in the fourth to sixth embodiments, if an input value varies across out1 (equal to 0.5) a dot can be free of delay to prevent a pseudo contour.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus converting an input signal representing a level in density of each pixel with a predetermined number of tones, into a signal with a number of tones smaller than said predetermined number of tones, comprising:

a first outputter comparing said input signal having a level in density falling within a first range with a first threshold value to output a signal of a first tone or a second tone;

a second outputter comparing said input signal having a level in density falling within a second range subsequent to said first range with a second threshold value to output a signal of the second tone or a third tone; and a controller controlling said first and second threshold values to be provided substantially in succession on a boundary of said first and second ranges.

2. The image processing apparatus of claim 1, wherein said controller controls said first and second threshold values to provide a small gap on the boundary of said first and second ranges between said first and second threshold values.

3. The image processing apparatus of claim 1, wherein said controller controls said first and second threshold values to be provided in succession on the boundary of said first and second ranges.

4. The image processing apparatus of claim 1, wherein said threshold value increases whenever a level in density of said input signal increases.

5. The image processing apparatus of claim 4, wherein said threshold value varies in proportion to the density of said input signal.

6. The image processing apparatus of claim 2, wherein said first and second threshold values have a gap between 0.1 to 0.2 as a ratio to a whole range in density.

7. An image processing apparatus converting an input signal representing a level in density of each pixel with a predetermined number of tones, into a signal with a number of tones smaller than said predetermined number of tones, comprising:

an outputter comparing said input signal having a level in density falling within a first range with a first threshold value to output a signal of a first tone or a second tone, and comparing said input signal having a level in density falling within a second range subsequent to said first range with a second threshold value to output a signal of the second tone or a third tone;

a controller controlling said first and second threshold values to be provided substantially in succession on a boundary of said first and second ranges; and a corrector using a difference between the level in density of said input signal and a signal output from said outputter to calculate a correction value correcting a level in density of a subsequent pixel and apply said correction value for correction.

8. The image processing apparatus of claim 7, wherein said controller controls said first and second threshold values to provide a small gap on the boundary of said first and second ranges between said first and second threshold values.

9. The image processing apparatus of claim 7, wherein said controller controls said first and second threshold values to be provided in succession on the boundary of said first and second ranges.

10. The image processing apparatus of claim 7, wherein said threshold value increases whenever a level in density of said input signal increases.

11. The image processing apparatus of claim 10, wherein said threshold value varies in proportion to the density of said input signal.

12. The image processing apparatus of claim 8, wherein said first and second threshold values have a gap between 0.1 to 0.2 as a ratio to a whole range in density.

13. An image processing method converting an input signal representing a level in density of each pixel with a predetermined number of tones, into a signal with a number of tones smaller than said predetermined number of tones, the steps of comprising;

comparing said input signal having a level in density falling within a first range with a first threshold value to output a signal of a first tone or a second tone, and comparing said input signal having a level in density falling within a second range subsequent to said first range with a second threshold value to output a signal of the second tone or a third tone;

controlling said first and second threshold values to be provided substantially in succession on a boundary of said first and second ranges; and calculating and outputting a correction value correcting a level in density of a subsequent pixel by using a difference between the level in density of said input signal and a signal output by said comparing step.

14. The image processing method of claim 13, wherein said first and second threshold values are controlled to provide a small gap on the boundary of said first and second ranges between said first and second threshold values.

15. The image processing method of claim 13, wherein said first and second threshold values are controlled to be provided in succession on the boundary of said first and second ranges.

16. The image processing method of claim 13, wherein said threshold value increases whenever a level in density of said input signal increases.

17. The image processing method of claim 16, wherein said threshold value varies in proportion to the density of said input signal.

18. The image processing method of claim 14, wherein said first and second threshold values have a gap between 0.1 to 0.2 as a ratio to a whole range in density.

* * * * *